(12) United States Patent
Aoki

(10) Patent No.: US 9,779,690 B2
(45) Date of Patent: Oct. 3, 2017

(54) IMAGE DISPLAY DEVICE, TEST DEVICE USING IMAGE DISPLAY DEVICE, AND IMAGE DISPLAY METHOD

(71) Applicant: ANRITSU CORPORATION, Kanagawa (JP)

(72) Inventor: Kazunori Aoki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 14/848,764

(22) Filed: Sep. 9, 2015

(65) Prior Publication Data

US 2016/0086571 A1    Mar. 24, 2016

(30) Foreign Application Priority Data

Sep. 19, 2014  (JP) ................ 2014-191202

(51) Int. Cl.
G09G 5/34      (2006.01)
G09G 5/02      (2006.01)
G06F 3/0488    (2013.01)
G06F 3/0485    (2013.01)
G06F 3/0484    (2013.01)
G09G 5/08      (2006.01)

(52) U.S. Cl.
CPC ............ G09G 5/02 (2013.01); G06F 3/0488 (2013.01); G06F 3/04847 (2013.01); G06F 3/04855 (2013.01); G09G 5/34 (2013.01); *G09G 5/08* (2013.01); *G09G 2330/12* (2013.01); *G09G 2350/00* (2013.01)

(58) Field of Classification Search
CPC .................................................. G06F 3/0485
See application file for complete search history.

(56) References Cited

U.S. PATENT DOCUMENTS

| 5,339,391 | A  | * | 8/1994  | Wroblewski | G06F 17/218 345/607 |
| 6,252,594 | B1 | * | 6/2001  | Xia        | G06F 3/0485 715/234 |
| 6,940,488 | B1 | * | 9/2005  | Siddiqui   | G06F 3/0312 345/163 |
| 8,607,156 | B1 | * | 12/2013 | Jania      | G06F 3/04855 715/786 |

(Continued)

FOREIGN PATENT DOCUMENTS

| JP | 2012-063859 A | 3/2012 |
| JP | 2014-072838   | 4/2014 |

*Primary Examiner* — Phi Hoang
(74) *Attorney, Agent, or Firm* — Pearne & Gordon LLP

(57) ABSTRACT

To provide an image display device and an image display method capable of causing an image displayed on a display device to be visually recognized without degrading the operability of the user. A scroll amount of an image displayed in an image display area is specified according to an operation of scrolling the image displayed in the image display area, the scroll amount is regulated so that the image displayed in the image display area is not out of the image display area if the image displayed in the image display area is scrolled to be out of the image display area when the image displayed in the image display area is scrolled according to the specified scroll amount, and a display mode of at least a portion of a peripheral area of the image display area is changed.

3 Claims, 13 Drawing Sheets

(56) References Cited

U.S. PATENT DOCUMENTS

| | | | |
|---|---|---|---|
| 2002/0029285 A1* | 3/2002 | Collins | G06F 3/1454 709/232 |
| 2010/0141596 A1* | 6/2010 | Junk | G05B 19/042 345/173 |
| 2012/0183271 A1* | 7/2012 | Forutanpour | G06F 17/30817 386/224 |
| 2014/0149923 A1* | 5/2014 | Horiike | G06F 3/0485 715/784 |
| 2015/0089454 A1* | 3/2015 | Wu | G06F 3/0485 715/863 |

* cited by examiner

| FIRST LAYER | SECOND LAYER | THIRD LAYER |
|---|---|---|
| Common | Frequency | Frame Structure |
| | | Channel Bandwidth |
| | | UL Channel |
| | | DL Channel |
| | | UL Frequency |
| | | DL Frequency |
| | | Operation Band |
| | Level | Input Level |
| | | Output Level |
| | | External Loss |
| | | Main UL |
| | | Main DL |
| | | AUX |
| | Signal | Channel Coding |
| | | Antenna Configuration |
| | | DCI Format |
| | UL RMC | Number of RB |
| | | Starting RB |
| | | RB Pos. |
| | | MCS Index |
| | | Modulation |
| Call Processing | Base Station Identity | Cell ID |
| | | MCC |
| | | MNC |
| | | TAC |
| | Mobile Station Identity | Paging IMSI |
| | | C-RNTI |
| | | Temporary C-RNTI for Handover |
| | | Authentication |
| | | Authentication Algorithm |
| | | Authentication Key K |
| | | AMF |
| | | Integrity Protection |
| | Power Control | TPC Pattern |
| | | p-Max |
| | | p0-NominalPUSCH |
| | | additionalSpectrumEmission |
| | | filterCoefficient |
| | | Power Control Offset |
| | BCCH/PCCH | modification Period Coeff |
| | | default Paging Cycle |
| | | nB |

FIG. 2

| FIRST LAYER | SECOND LAYER | THIRD LAYER |
|---|---|---|
| TX Measurement Setup | Relative Power | Measurement Method |
| | | Measurement Subframe |
| | | UL Number of RB 1 |
| | | RB Change |
| | Aggregate Power | Measurement Subframe |
| RX Measurement Setup | Throughput | Number of Sample |
| | | Early Decision |
| | CQI | Number of Sample |
| | | Range of Counting |
| | | RX Measurement Timeout Length |
| Fundamental Measurement | General | Power Measurement |
| | | Meas.Count |
| | | Power Template |
| | | Meas. Count |
| | | Occupied Bandwidth |
| | | Meas.Count |
| | | Spectrum Emission Mask |
| | | Meas.Count |
| | | Adjacent Channel Power |
| | | Meas.Count |
| | | Modulation Analysis |
| | | Meas.Count |
| | | Throughput |
| | | CQI |

FIG. 3

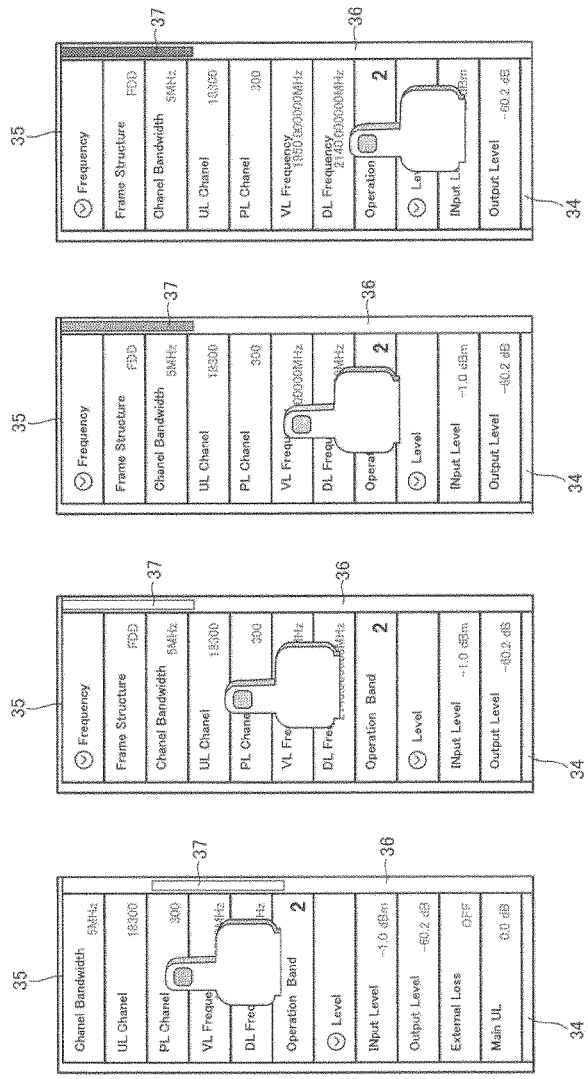

IMAGE DISPLAY DEVICE, TEST DEVICE USING IMAGE DISPLAY DEVICE, AND IMAGE DISPLAY METHOD

TECHNICAL FIELD

The present invention relates to an image display device, a test device using the image display device, and an image display method that display, for example, an image for setting parameters of a measurement instrument on a display device.

BACKGROUND ART

Conventionally, a technology for displaying an image displayed on a display device together with a scroll bar and scrolling the image displayed on the display device according to an operation with respect to the scroll bar has been proposed as in a technology proposed in Patent Document 1.

RELATED ART DOCUMENT

Patent Document

[Patent Document 1] JP-A-2014-72838 (FIG. 2)

DISCLOSURE OF THE INVENTION

Problem that the Invention is to Solve

However, in such related art, there is a problem in that, when an image displayed on a display device is caused to be scrolled in a state in which the related art is applied to a device having a touch panel, it is difficult to understand whether the image has been scrolled to a boundary (in other words, the image has been scrolled to an end of the image) or whether a scroll operation has not been recognized, and operability of a user is degraded when the image has not been scrolled or the scroll of the image has stopped.

The present invention has been made in order to solve such a problem, and an object thereof is to provide an image display device, a test device using the image display device, and an image display method capable of causing an image displayed on a display device to be visually recognized without degrading operability of a user.

Means for Solving the Problem

According to the present invention, there is provided an image display device including a display control unit (24) that displays a portion of a predetermined image to be displayed on a display device (21) in an image display area (35) of the display device, and scrolls the predetermined image according to a scroll operation with respect to the predetermined image detected by an operation detection unit (22), the image display device including: a scroll amount specifying unit (40) that specifies an amount to be scrolled of the predetermined image displayed in the image display area according to the scroll operation detected by the operation detection unit; and a scroll amount regulation unit (41) that regulates the amount to be scrolled so that an end of the predetermined image does not enter the inside of the image display area when the end of the predetermined image enters the inside of the image display area if the display control unit scrolls the predetermined image displayed in the image display area according to the amount to be scrolled specified by the scroll amount specifying unit, wherein the display control unit scrolls the predetermined image according to the amount to be scrolled, and changes a display mode of at least a portion of a peripheral area of the image display area in the display device when the amount to be scrolled is regulated by the scroll amount regulation unit.

With this configuration, in the image display device of the present invention, if the operation of scrolling the predetermined image displayed in the image display area to be out of the image display area is detected, the scroll amount is regulated and the image displayed in the image display area is scrolled so that the predetermined image displayed in the image display area is not out of the image display area, and the display mode of at least a portion of the peripheral area of the image display area is changed to cause the user to recognize that the predetermined image has been scrolled to an end in the image display area. Thus, it is possible to cause the predetermined image displayed on the display device to be visually recognized without degrading operability of a user.

The display control unit may change a display mode of at least a portion of a peripheral area of the image display area according to a regulation amount of the amount to be scrolled regulated by the scroll amount regulation unit.

With this configuration, in the image display device of the present invention, it is possible to cause the user to recognize that the predetermined image displayed in the image display area is further scrolled regardless of the fact that the predetermined image has been scrolled to the end in the image display area.

The display control unit may display a scroll bar (36) for scrolling the predetermined image together with the predetermined image on the display device, and change a display mode of the slider (37) of the scroll bar when the amount to be scrolled is regulated by the scroll amount regulation unit.

With this configuration, in the image display device of the present invention, it is possible to cause the user to recognize that the predetermined image has been scrolled to an end in the image display area by changing the display mode of the slider of the scroll bar if the predetermined image has been scrolled to the end in the image display area.

The display control unit may change a display mode of a slider of the scroll bar by changing shading of a display color of the slider of the scroll bar.

With this configuration, in the image display device of the present invention, it is possible to cause the user to recognize that the predetermined image has been scrolled to an end in the image display area by changing the shading of the display color of the slider of the scroll bar if the predetermined image has been scrolled to the end in the image display area.

The display control unit may change shading of a display color of the slider of the scroll bar according to a regulation amount of the amount to be scrolled regulated by the scroll amount regulation unit.

With this configuration, in the image display device of the present invention, it is possible to cause the user to recognize that the predetermined image has been scrolled to the end in the image display area by changing the shading of the display color of the slider of the scroll bar according to the regulation amount of the regulated amount to be scrolled if the predetermined image has been scrolled to the end in the image display area.

Further, a test device (1) of the present invention is a test device (1) including at least the image display device (1) according to any one of claims 1 to 5, and a test execution unit (11) that performs test of a tested terminal (2), in which test conditions are set by the operation detection unit detecting an input operation with respect to a predetermined image displayed in the image display area of the display device of the image display device, and the test execution unit executes the test based on the test conditions input in the image display device.

With this configuration, in the test device of the present invention, when the predetermined image displayed in the image display area is operated to set the test conditions, the user is caused to recognize that the predetermined image has been scrolled to the end in the image display area. Thus, it is possible to set the test conditions without degrading the operability of the user.

According to the present invention, there is provided an image display method of causing an image display device to display a portion of a predetermined image to be displayed on a display device (21) in an image display area (35) of the display device (21), the method including: an operation detection step of detecting a scroll operation with respect to the predetermined image displayed in the image display area of the display device; a scroll amount specifying step of specifying an amount to be scrolled of the predetermined image displayed in the image display area according to the scroll operation detected in the operation detection step; a scroll amount regulation step of regulating the amount to be scrolled so that an end of the predetermined image does not enter the inside of the image display area when the end of the predetermined image enters the inside of the image display area if the predetermined image displayed in the image display area is scrolled according to the amount to be scrolled specified in the scroll amount specifying step; and an image scroll step of scrolling the predetermined image according to the amount to be scrolled, and changing a display mode of at least a portion of a peripheral area of the image display area when the amount to be scrolled is regulated in the scroll amount regulation step.

Thus, in the image display method of the present invention, if the operation of scrolling the predetermined image displayed in the image display area to be out of the image display area is detected, the scroll amount is regulated and the image displayed in the image display area is scrolled so that the predetermined image displayed in the image display area is not out of the image display area, and the display mode of at least a portion of the peripheral area of the image display area is changed to cause the user to recognize that the predetermined image has been scrolled to the end in the image display area. Thus, it is possible to cause the predetermined image displayed on the display device to be visually recognized without degrading operability of the user.

The image scroll step may include changing the display mode of at least a portion of the peripheral area of the image display area according to a regulation amount of the amount to be scrolled regulated in the scroll amount regulation step.

With this image display method, it is possible to cause the user to recognize that the predetermined image displayed in the image display area is further scrolled regardless of the fact that the predetermined image displayed in the image display area has been scrolled to the end.

In the image display method of causing the image display device to display a scroll bar (36) for scrolling the predetermined image together with the predetermined image on the display device, the image scroll step may include changing a display mode of the slider (37) of the scroll bar when the amount to be scrolled is regulated in the scroll amount regulation step.

With this image display method, it is possible to cause the user to recognize that the predetermined image has been scrolled to an end in the image display area by changing the display mode of the slider of the scroll bar if the predetermined image has been scrolled to the end in the image display area.

The image scroll step may include changing a display mode of the slider of the scroll bar by changing shading of a display color of the slider of the scroll bar.

With this image display method, it is possible to cause the user to recognize that the predetermined image has been scrolled to an end in the image display area by changing the shading of the display color of the slider of the scroll bar if the predetermined image has been scrolled to the end in the image display area.

The image scroll step may include changing shading of the display color of the slider of the scroll bar according to a regulation amount of the amount to be scrolled regulated in the scroll amount regulation step.

With this image display method, it is possible to cause the user to recognize that the predetermined image has been scrolled to the end in the image display area by changing the shading of the display color of the slider of the scroll bar according to the regulation amount of the regulated amount to be scrolled if the predetermined image has been scrolled to the end in the image display area.

Advantage of the Invention

The present invention can provide the image display device, the test device using the image display device, and the image display method capable of causing the image displayed on the display device to be visually recognized without degrading the operability of the user.

BRIEF DESCRIPTION OF THE DRAWINGS

FIG. 2 is a conceptual diagram illustrating a hierarchical relationship of parameters referred to by the mobile terminal test device according to the embodiment of the present invention.

FIG. 3 is a conceptual diagram subsequent to FIG. 2.

FIG. 7A is a schematic diagram illustrating a list image scrolled in the image display area in the first display area of the main window illustrated in FIG. 4, FIG. 7B is a schematic diagram illustrating a list image scrolled to an end in the image display area, FIG. 7C is a schematic diagram illustrating the list image of which the scroll is regulated in the image display area, and FIG. 7D is a schematic diagram illustrating the list image of which the scroll is further regulated in the image display area.

FIG. 9A is a schematic diagram illustrating a state before parameters items constituting a list displayed in the first display area of the main window illustrated in FIG. 4 are changed, FIG. 9B is a schematic diagram illustrating a state in which the parameter items are changed, and FIG. 9C is a schematic diagram illustrating a state after the parameter items are changed.

BEST MODE FOR CARRYING OUT THE INVENTION

Hereinafter, embodiments of the present invention will be described with reference to the drawings. In the present embodiment, an example in which the image display device of the present invention is applied to a mobile terminal test device for testing a mobile terminal will be described.

Figure 1:
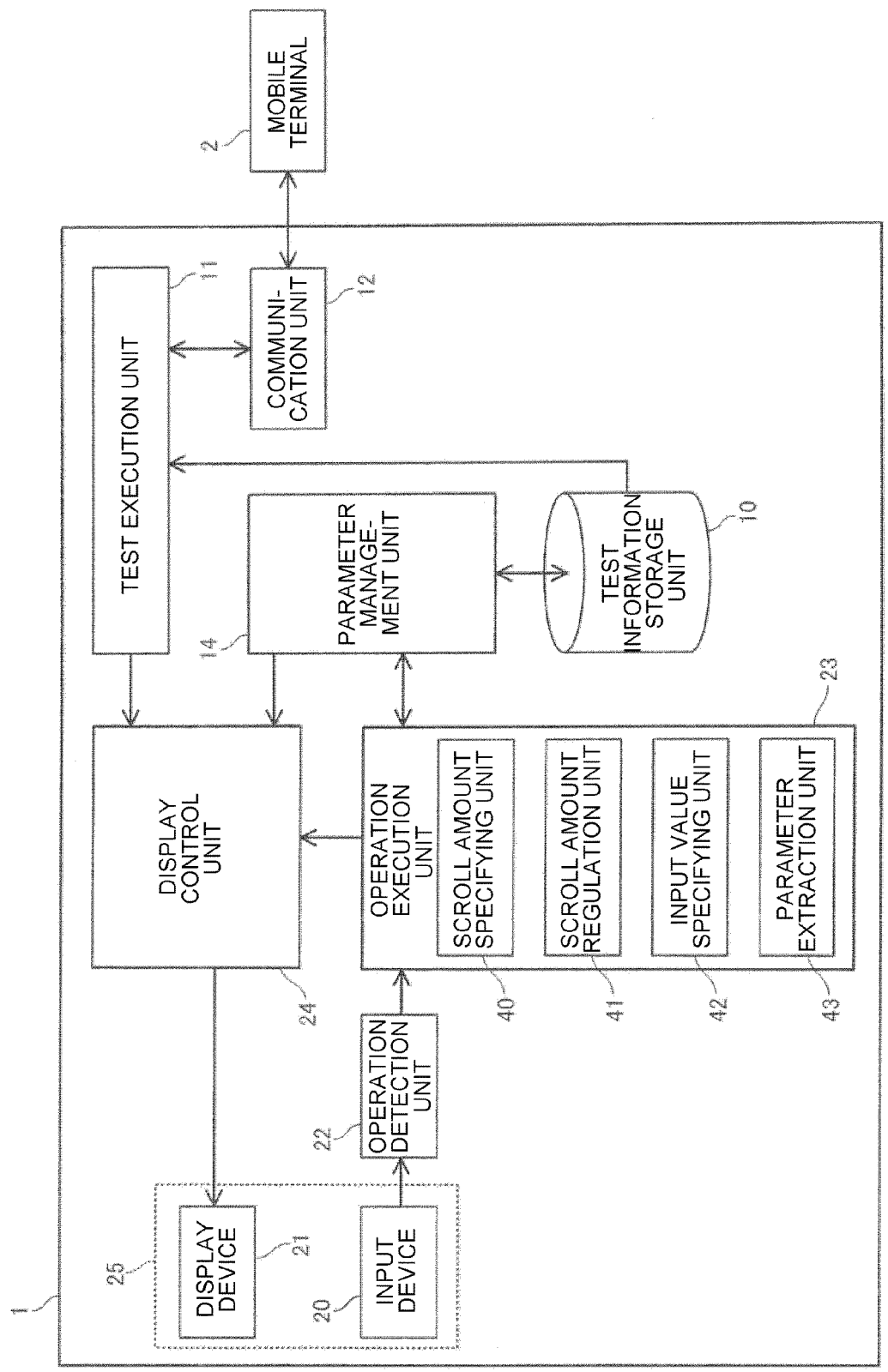
FIG. 1 is a block diagram of a mobile terminal test device according to an embodiment of the present invention.

As illustrated in FIG. 1, a mobile terminal test device 1 transmits and receives a signal to and from a mobile terminal 2 that is a tested terminal in a wired manner via a coaxial cable or the like. Also, the mobile terminal test device 1 may transmit and receive a signal to and from the mobile terminal 2 wirelessly via an antenna.

The mobile terminal test device 1 includes a test information storage unit 10 in which information including a scenario and parameters for performing test of the mobile terminal 2 is stored, a test execution unit 11 that executes test of the mobile terminal 2 based on the information stored in the test information storage unit 10, a communication unit 12 that performs communication with the mobile terminal 2 according to the test executed by the test execution unit 11, and a parameter management unit 14 that manages the parameters stored in the test information storage unit 10.

Further, the mobile terminal test device 1 further includes an input device 20 including, for example, a touch pad, a display device 21 including, for example, a liquid crystal display device, an operation detection unit 22 that detects an operation performed by the input device 20, an operation execution unit 23 that executes a process corresponding to the operation detected by the operation detection unit 22, and a display control unit 24 that controls the display device 21.

Here, the mobile terminal test device 1 includes a computer device (not illustrated) in which a communication module for performing communication with the mobile terminal 2 is provided. This computer system includes a CPU (Central Processing Unit), a ROM (Read Only Memory), a RAM (Random Access Memory), a hard disk drive, an input and output port, and a touch panel (not illustrated).

A program for causing the computer device to function as the mobile terminal test device 1 is stored in the ROM and the hard disk device of the computer device. That is, by the CPU executing the program stored in the ROM using the RAM as a work area, the computer device functions as the mobile terminal test device 1.

Thus, in the present embodiment, the test information storage unit 10 includes a RAM or a hard disk device. The test execution unit 11, the parameter management unit 14, the operation detection unit 22, the operation execution unit 23, and the display control unit 24 are configured using a CPU. The communication unit 12 includes a communication module.

Further, the input device 20 and the display device 21 are configured integrally using a touch panel 25. That is, an image displayed on the display device 21 by the display control unit 24 constitutes a user interface for causing information to be input in cooperation with the input device 20, as well as indicating information.

The parameters stored in the test information storage unit 10 is hierarchized, and managed by the parameter management unit 14. That is, the parameter management unit 14 performs updating and reading of a value of each parameter stored in the test information storage unit 10.

As illustrated in FIGS. 2 and 3, parameters of the first layer in the present embodiment are classified into "Common", "Call Processing", "TX Measurement Setup", "RX Measurement Setup", and "Fundamental Measurement". Also, some of the parameters illustrated in FIGS. 2 and 3 are omitted in order to facilitate understanding of the invention.

In FIG. 2, "Common" indicates a group of parameters of the first layer, which are parameters regarding common communication, and includes respective parameters: "Frequency", "Level", "Signal", and "UL RMC".

"Frequency" is a group of parameters of a second layer classified as "Common", which are parameters regarding a communication frequency, and includes respective parameters: "Frame Structure", "Channel Bandwidth", "UL Channel", "DL Channel", "UL Frequency", "DL Frequency, and "Operation Band".

"Frame Structure" is a parameter of a third layer classified as "Frequency", and indicates a duplex mode. In the present embodiment, the frame structure is selected from among "FDD" (Frequency Division Duplex) and "TDD" (Time Division Duplex). Also, an initial value of "Frame Structure" is set to "FDD".

"Channel Bandwidth" is a parameter of the third layer classified as "Frequency", and indicates a channel bandwidth. "Channel Bandwidth" is selected from among "1.4 MHz", "3 MHz", "5 MHz", "10 MHz", "15 MHz" and "20 MHz". Also, an initial value of "Channel Bandwidth" is set to "5 MHz."

"UL Channel" is a parameter of the third layer classified as "Frequency", and indicates a channel of an uplink (a link from the mobile terminal 2 to the mobile terminal test device 1). A setting range of "0" to "65535" is defined. Also, an initial value of "UL Channel" is set to "18300".

"DL Channel" is a parameter of the third layer classified as "Frequency", and indicates a channel of a downlink (a link from the mobile terminal test device 1 to the mobile terminal 2). A setting range of "0" to "65535" is defined. Also, an initial value of "DL Channel" is set to "300".

"UL Frequency" is a parameter of the third layer classified as "Frequency", and indicates a frequency of the downlink. A setting range of "0.400000 MHz" to "2700.000000 MHz" is defined. Also, an initial value of "UL Frequency" is set to "1950.000000 MHz".

"DL Frequency" is a parameter of the third layer classified as "Frequency", and indicates a frequency of the uplink. A setting range of "0.400000 MHz" to "2700.000000 MHz" is defined. Also, an initial value of "DL Frequency" is set to "2140.000000 MHz".

"Operation Band" is a parameter of the third layer classified as "Frequency", and indicates an operation band. A setting range of "1" to "43" is defined. Also, an initial value of "Operation Band" is set to "1".

"Level" indicates a group of parameters of the second layer classified as "Common", which are parameters regarding a communication level. "Level" includes parameters: "Input Level", "Output Level", "External Loss", "Main UL", "Main DL, "and" AUX ".

"Input Level" is a parameter of the third layer classified as "Level", and indicates a level of an RF signal input to the mobile terminal 2. A setting range of "−65.0 dBm" to "+35.0 dBm" is defined. Also, an initial value of "Input Level" is set to "−1.0 dBm".

"Output Level" is a parameter of the third layer classified as "Level", and indicates a sum of output levels of all channels. A setting range of "−120.0 dBm" to "−10.0 dBm" is defined. Also, an initial value of "Output Level" is set to "−60.2 dBm".

"External Loss" is a parameter of the third layer classified as "Level", and indicates a state of an external loss. "External Loss" is selected from "ON", "OFF", and "COMMON". Also, an initial value of "External Loss" is set to "OFF".

"Main UL" is a parameter of the third layer classified as "Level", and indicates an offset value of the uplink of a main connector. A setting range of "−99.0 dBm" to "+99.0 dBm" is defined. Also, an initial value of "Main UL" is set to "0.0 dBm".

"Main DL" is a parameter of the third layer classified as "Level", and indicates an offset value of the downlink of the main connector. A setting range of "−99.0 dBm" to "+99.0 dBm" is defined. Also, an initial value of "Main DL" is set to "0.0 dBm".

"AUX" is a parameter of the third layer classified as "Level", and indicates an offset value of the downlink of a complementary connector. A setting range of "−99.0 dBm" to "+99.0 dBm" is defined. Also, an initial value of "AUX" is set to "0.0 dBm".

"Signal" is a group of parameters of the second layer classified as "Common", and indicates parameters regarding a communication signal. "Signal" includes respective parameters: "Channel Coding", "Antenna Configuration", and "DCI Format".

"Channel Coding" is a parameter of the third layer classified as "Signal", and indicates a configuration of the channel. "Channel Coding" is selected from among "RMC" (Reference Measurement Channel) and "Packet". Also, an initial value of "Channel Coding" is set to "RMC".

"Antenna Configuration" is a parameter of the third layer classified as "Signal", and indicates a configuration of the antenna. "Antenna Configuration" is selected from among "Single Antenna", "Receiver Diversity", "Transmit Diversity", "2×2 MIMO (Open Loop)", "2×2 MIMO (Closed Loop Single Layer)", and "2×2 MIMO (Closed Loop Multi Layer)." Also, an initial value of "Antenna Configuration" is set to "Single Antenna".

"DCI Format" (Downlink Control Information Format) is a parameter of the third layer classified as "Signal", and indicates a format of a control signal of the downlink. The "DCI Format" is selected from among "1A" and "1". Also, an initial value of "DCI Format" is set to "1A".

"UL RMC" indicates a group of parameters of the second layer classified as "Common", and which are parameters regarding RMC of the uplink signal. "UL RMC" includes respective parameters: "Number of RB", "Starting RB", "RB Pos.", "MCS Index", and "Modulation".

"Number of RB" is a parameter of the third layer classified as "UL RMC", and indicates the number of RBs (Resource Blocks) assigned to the uplink signal. A setting range of "0" to "100" is defined. Also, an initial value of "Number of RB" is set to "25".

"Starting RB" is a parameter of the third layer classified as "UL RMC", and indicates a start number of the RB in the uplink signal. A setting range of "0" to "99" is defined. Also, an initial value of "Starting RB" is set to "0".

"RB Pos." is a parameter of the third layer classified as "UL RMC", and indicates a position to which the RB is assigned in the uplink signal. "RB Pos." is selected from among "MIN", "MID", and "MAX". Also, an initial value of "RB Pos." is set to "MIN".

"MCS Index" is a parameter of the third layer classified as "UL RMC", and indicates an index of an MSC (Mobile Switching Center) of the uplink signal. A setting range of "0" to "28" is defined. Also, an initial value of "MCS Index" is set to "5". Further, the set value of "MCS Index" is correspondingly changed when a value of "Modulation" or the like is changed.

"Modulation" is a parameter of the third layer classified as "UL RMC", indicates a modulation scheme of an uplink signal, and is selected from among "QPSK" (Quadrature Phase Shift Keying) and "16QAM" (16 Quadrature Amplitude Modulation). Also, an initial value of "Modulation" is set to "QPSK". Further, when a value of "MCS Index" or the like is changed, the set value of "Modulation" is correspondingly changed.

"Call Processing" is a parameter of the first layer, indicates a group of parameters regarding a call connection, and includes respective parameters "Base Station Identity", "Mobile Station Identity", "Power Control", and "BCCH/PCCH".

"Base Station Identity" is a parameter of the second layer classified as "Call Processing", indicates a group of parameters regarding identification information of a base station, and includes respective parameters of "Cell ID", "MCC", "MNC", and "TAC".

"Cell ID" is a parameter of the third layer classified as "Base Station Identity", and indicates an ID for identifying a cell. A setting range of "0" to "503" is defined. Also, an initial value of "Cell ID" is set to "0".

"MCC" is a parameter of the third layer classified as "Base Station Identity", and indicates MCC (Mobile Country Code) of LAI (Local Area Identification). A setting range of "0" to "999" is defined. Also, an initial value of "MCC" is set to "1".

"MNC" is a parameter of the third layer classified as "Base Station Identity", and indicates MNC (Mobile Network Code) of LAI. A setting range of "0" to "999" is defined. Also, an initial value of "MNC" is set to "1".

"TAC" is a parameter of the third layer classified as "Base Station Identity", and indicates TAC (Tracking Area Code) of LAI. A setting range of "0x0000" to "0xFFFF" is defined. Also, an initial value of "TAC" is set to "0x0001".

"Mobile Station Identity" is a parameter of the second layer classified as "Call Processing", indicates a group of parameters regarding identification information of the mobile terminal 2, and includes respective parameters "Paging IMSI", "C-RNTI", "Temporary C-RNTI for Handover", "Authentication", "Authentication Algorithm", "Authentication Key K", "AMF", and "Integrity Protection".

"Paging IMSI" is a parameter of the third layer classified as "Mobile Station Identity", indicates a type of IMSI (International Mobile Subscriber Identity) transmitted to the mobile terminal 2 at the time of paging transmission, and is selected from among "AUTO" and "FIX". Also, an initial value of "Paging IMSI" is set to "AUTO".

"C-RNTI" is a parameter of the third layer classified as "Mobile Station Identity", and indicates a C-RNTI (Cell-Radio Network Temporary Identifier). A setting range of "0x0001" to "0xFFF3" is defined. Also, an initial value of "C-RNTI" is set to "0xAAAA".

"Temporary C-RNTI for Handover" is a parameter of the third layer classified as "Mobile Station Identity", and indicates a temporary C-RNTI used at the time of handover. A setting range of "0x0001" to "0xFFF3" is defined. Also, an initial value of "C-Temporary C-RNTI for Handover" is set to "0xAAAA".

"Authentication" is a parameter of the third layer classified as "Mobile Station Identity", indicates whether an authentication key is generated, and is switched between "ON" and "OFF". Also, an initial value of "Authentication" is set to "ON".

"Authentication Algorithm" is a parameter of the third layer classified as "Mobile Station Identity", indicates an algorithm for generating the authentication key, and is selected from among "XOR" and "MILENAGE". Also, an initial value of "Authentication Algorithm" is set to "XOR".

"Authentication Key K" is a parameter of the third layer classified as "Mobile Station Identity", and indicates an authentication key of the mobile terminal 2 represented by the 32-digit hexadecimal number. A setting range of "0x00000000" to "0xFFFFFFFF" is defined. Also, an initial value of "Authentication Key K" is set to "0x112233".

"AMF" is the third layer of parameters, and indicates an authentication key of an AMF (Action Message Format) represented by a four-digit hexadecimal number. A setting range of "0x0000" to "0xFFFF" is defined. Also, an initial value of "AMF" is set to "0x8000".

"Integrity Protection" is a parameter of the third layer classified as "Mobile Station Identity", indicates Integrity Protection of C-plane regarding exchange of information on call control, and is selected from among "OFF", "NULL", and "SNOW3G". Also, an initial value of "Integrity Protection" is set to "NULL".

"Power Control" is a parameter the second layer classified as "Call Processing", indicates a group of parameters regarding power control, and includes respective parameters "TPC Pattern", "p-Max", "p0-NominalPUSCH", "additionalSpectrumEmission", "filterCoefficient", and "Power Control Offset".

"TPC Pattern" is a parameter of the third layer classified as "Power Control", indicates a TPC (Transmit Power Control) pattern of an uplink, and is selected from among "AUTO", "ALLM1", "ALL0", "ALL1" "ALL3", and "ALT". Also, an initial value of "TPC Pattern" is set to "AUTO".

"P-Max" is a parameter of the third layer classified as "Power Control", and indicates p-Max included in a SystemInformationBlockType1 message transmitted from the base station to the mobile terminal. A setting range of "−30" to "33" is defined. Also, an initial value of "p-Max" is set to "33".

"p0-NominalPUSCH" is a parameter of the third layer classified as "Power Control", and indicates p0-NominalPUSCH included in a SystemInformationBlockType2 (hereinafter referred to as "SIB2") message transmitted from a base station to a mobile terminal. A setting range of "−126" to "24" is defined. Also, an initial value of "p0-NominalPUSCH" is set to "−85".

"AdditionalSpectrumEmission" is a parameter of the third layer classified as "Power Control", and indicates additionalSpectrumEmission included in an SIB2 message. A setting range of "NS_01" to "NS_32" is defined. Also, an initial value of "p0-NominalPUSCH" is set to "NS_01".

"FilterCoefficient" is a parameter of the third layer classified as "Power Control", indicates a filter coefficient, and is selected from among "FC4" and "FC8". Also, an initial value of "FilterCoefficient" is set to "FC4".

"Power Control Offset" is a parameter of the third layer classified as "Power Control", and indicates an offset value from an input level of a target level of an uplink controlled by TPC. A setting range of "0.0" to "−20.0" is defined. Also, an initial value of "Power Control Offset" is set to "0.0". Further, "Power Control Offset" is referred to only when "TPC Pattern" is set to "AUTO".

"BCCH/PCCH" is a parameter of the second layer classified as "Call Processing", indicates a group of parameters regarding BCCH (Broadcast Control Channel) and PCCH (Paging Control Channel), and includes respective parameters "modificationPeriodCoeff", "defaultPagingCycle", and "nB".

"ModificationPeriodCoeff" is a parameter of the third layer classified as "BCCH/PCCH", indicates ModificationPeriodCoeff included in an SIB2 message, and is selected from among "N2", "N4", "N8", and "N16". Also, an initial value of "ModificationPeriodCoeff" is set to "N4".

"DefaultPagingCycle" is a parameter of the third layer classified as "BCCH/PCCH", indicates DefaultPagingCycle included in the SIB2 message, and is selected from among "32", "64", "128", and "256". Also, an initial value of "DefaultPagingCycle" is set to "128".

"NB" is a parameter of the third layer classified as "BCCH/PCCH", indicates NB included in the SIB2 message, and is selected from among "4T", "2T", "T", "T_2", "T_4" "T_8", "T_16" and "T_32". Also, an initial value of "NB" is set to "T".

In FIG. 3, "TX Measurement Setup" is a parameter of the first layer, indicates a group of parameters regarding measurement according to the transmission of the mobile terminal 2, and includes respective parameters "Relative Power" and "Aggregate Power".

"Relative Power" is a parameter of the second layer classified as "TX Measurement Setup", indicates a group of parameters regarding a relative value of the transmission power set in the mobile terminal 2, and includes respective parameters of "Measurement Method", "Measurement Subframe", "UL Number of RB 1", and "RB Change".

"Measurement Method" is a parameter of the third layer classified as "Relative Power", indicates a measurement method in power control tolerance (Relative Power) measurement, and is selected from among "AUTO" and "MANUAL". Also, an initial value of "Measurement Method" is set to "AUTO".

"Measurement Subframe" is a parameter of the third layer classified as "Relative Power", and indicates the number of measurement subframes in power control tolerance (Relative Power) measurement. A setting range of "2" to "100" is defined. Also, an initial value of "Measurement Subframe" is set to "10".

"UL Number of RB 1" is a parameter of the third layer classified as "Relative Power", and indicates a UL number of RB−1 in power control tolerance (Relative Power) measurement. A setting range of "1" to "100" is defined. Also, an initial value of "UL Number of RB 1" is set to "1".

"RB Change" is a parameter of the third layer classified as "Relative Power", and indicates a sub-frame in which "UL Number of RB" is changed from "UL Number of RB 1" to "UL Number of RB 2" when "Ramping Up" or "Ramping Down" of relative power is set in a test type. A setting range of " 0 "to" 99 "is defined. Also, an initial value of "RB Change" is set to "10".

"Aggregate Power" is a parameter as the parameters of the second layer classified as "TX Measurement Setup", indicates a group of parameters regarding a reference value of transmission power set in the mobile terminal 2, and includes a parameter "Measurement Subframe".

"Measurement Subframe" is a parameter of the third layer classified as "Aggregate Power", and indicates the number of measurement sub-frames in power control tolerance (Aggregate Power) measurement. A setting range of "2" to "20" is defined. Also, an initial value of "Measurement Subframe" is set to "5".

"RX Measurement Setup" is a parameter of the first layer, indicates a group of parameters regarding measurement related to reception of the mobile terminal 2, and includes respective parameters "Throughput" and "CQI".

"Throughput" is a parameter of the second layer classified as "RX Measurement Setup", indicates a group of parameters regarding throughput, and includes respective parameters of "Number of Sample" and "Early Decision".

"Number of Sample" is a parameter of the third layer classified as "Throughput", and indicates the number of samples of throughput measurement. A setting range of "1" to "99999999" is defined. Also, an initial value of "Number of Sample" is set to "2000".

"Early Decision" is a parameter of the third layer classified as "Throughput", indicates ON/OFF of the Early Decision, and is switched between "ON" and "OFF". An initial value of "Early Decision" is set to "OFF".

Further, when "Early Decision" is set to ON, DL Throughput measurement ends at a time of arrival at Early Decision. When "Early Decision" is set to OFF, measurement corresponding to the number of samples set in "Number of Sample" of the same group is performed.

"CQI" is a parameter of the second layer classified as "RX Measurement Setup", indicates a group of parameters regarding CQI (Channel Quality Indicator), and includes respective parameters "Number of Sample", "Range of Counting", and "RX Measurement Timeout Length".

"Number of Sample" is a parameter of the third layer classified as "CQI", and indicates the number of samples of CQI (Channel Quality Indicator) measurement. A setting range of "1" to "9999" is defined. Also, an initial value of "Number of Sample" is set to "2000".

"Range of Counting" is a parameter of the third layer classified as "CQI", and indicates a counting range of CQI. A setting range of "0" to "15" is defined. Also, an initial value of "Range of Counting" is set to "3".

"RX Measurement Timeout Length" is a parameter of the third layer classified as "CQI", and indicates a time of timeout of reception measurement. A setting range of "1 s" to "60 s" is defined. Also, an initial value of "RX Measurement Timeout Length" is set to "10 s".

"Fundamental Measurement" is a parameter of the first layer, indicates a group of basic parameters related to measurement, and includes a parameter "General".

"General" is a parameter of the second layer classified as "Fundamental Measurement", indicates a group of general parameters, and includes respective parameters "Power Measurement", "Meas. Count", "Power Template", "Meas. Count", "Occupied Bandwidth", "Meas. Count", "Spectrum Emission Mask", "Meas. Count", "Adjacent Channel Power", "Meas. Count", "Modulation Analysis", "Meas. Count", "Throughput", and "CQI".

"Power Measurement" is a parameter of the third layer classified as "General", indicates whether or not power measurement is performed, and is switched between "ON" and "OFF". Also, an initial value of "Power Measurement" is set to "ON".

"Meas. Count" following "Power Measurement" is a parameter of the third layer classified as "General", and indicates the number of measurements of power measurement. A setting range of "1" to "1000" is defined. Also, an initial value of "Meas. Count" is set to "1".

"Power Template" is a parameter of the third layer classified as "General", indicates whether Power Template measurement is performed, and is switched between "ON" and "OFF". Also, an initial value of "Power Template" is set to "OFF".

"Meas. Count" following "Power Template" is a parameter of the third layer classified as "General", and indicates the number of power template measurement. A setting range of "1" to "1000" is defined. Also, an initial value of "Meas. Count" is set to "1".

"Occupied Bandwidth" is a parameter of the third layer classified as "General", indicates whether the occupied bandwidth measurement is performed, and is switched between "ON" and "OFF". Also, an initial value of "Occupied Bandwidth" is set to "OFF".

"Meas. Count" following "Occupied Bandwidth" is a parameter of the third layer classified as "General", and indicates the number of occupied bandwidth measurements. A setting range of "1" to "1000" is defined. Also, an initial value of "Meas. Count" is set to "1".

"Spectrum Emission Mask" is a parameter of the third layer classified as "General", indicates whether Spectrum Emission Mask (also referred to as "SEM") measurement is performed, and is switched between "ON" or "OFF". Also, an initial value of "Spectrum Emission Mask" is set to "OFF".

"Meas. Count" following "Spectrum Emission Mask" is a parameter of the third layer classified as "General", and indicates the number of SEM measurements. A setting range of "1" to "1000" is defined. Also, an initial value of "Meas. Count" is set to "1".

"Adjacent Channel Power" is a parameter of the third layer classified as "General", indicates whether adjacent channel leakage power (also referred to as "ACLR") measurement is performed, and is switched between "ON" and "OFF". Also, an initial value of "Adjacent Channel Power" is set to "OFF".

"Meas. Count" following "Adjacent Channel Power" is a parameter of the third layer classified as "General", and indicates the number of ACLR measurements. A setting range of "1" to "1000" is defined. Also, an initial value of "Meas. Count" is set to "1".

"Modulation Analysis" is a parameter of the third layer classified as "General", indicates whether modulation analysis is performed, and is switched between "ON" and "OFF". Also, an initial value of "Modulation Analysis" is set to "ON".

"Meas. Count" following "Modulation Analysis" is a parameter of the third layer classified as "General", and indicates the number of modulation analysis. A setting range of "1" to "1000" is defined. Also, an initial value of "Meas. Count" is set to "1".

"Throughput" is a parameter of the third layer classified as "General", indicates whether throughput measurement is performed, and is switched between "ON" and "OFF". Also, an initial value of "Throughput" is set to "OFF".

"CQI" is a parameter of the third layer classified as "General", indicates whether CQI measurement is performed, and is switched between "ON" and "OFF". Also, an initial value of "CQI" is set to "OFF".

The above parameters are typical parameters set in the mobile terminal test device 1. Thus, in the mobile terminal test device 1, since the types of parameters, that is, the setting items, are enormous, setting of the parameters in the mobile terminal test device 1 is very troublesome work for the user.

Figure 4:
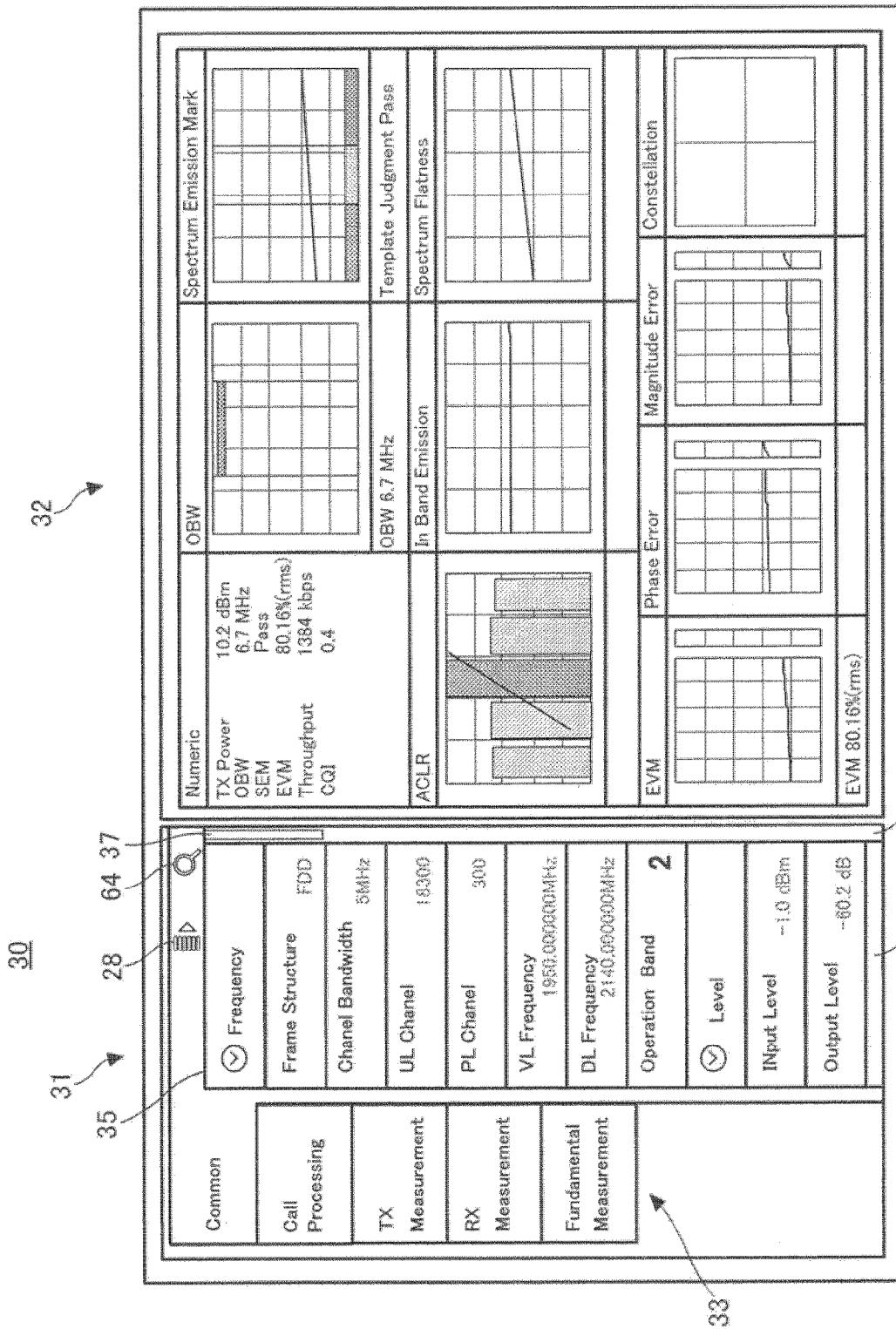
FIG. 4 is a schematic diagram of a main window in a first display control state that is displayed by the mobile terminal test device according to the embodiment of the present invention.
Figure 5:
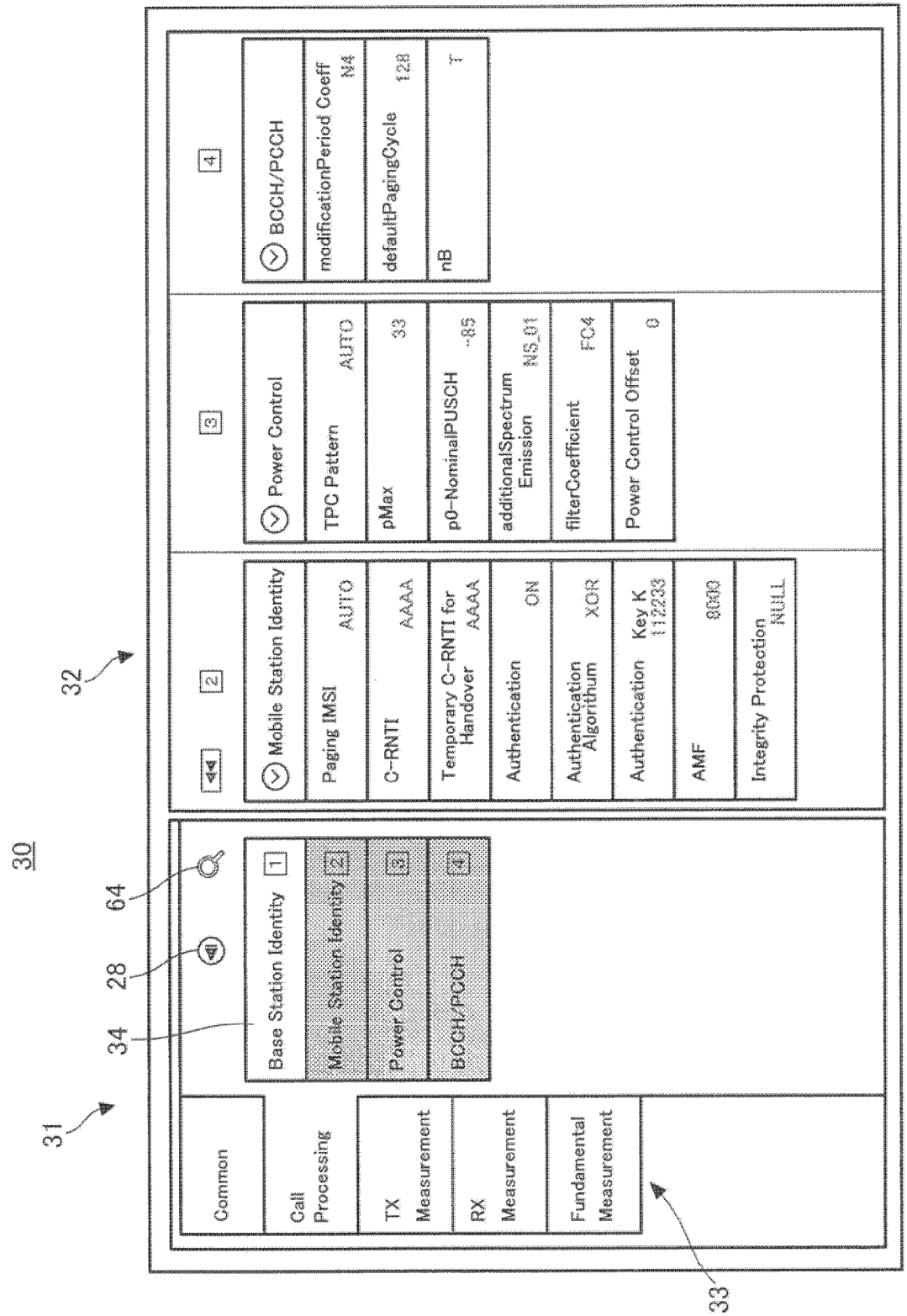
FIG. 5 is a schematic diagram of a main window in a second display control state that is displayed by the mobile terminal test device according to the embodiment of the present invention.

As illustrated in FIGS. 4 and 5, the display control unit 24 causes the display device 21 to display a main window 30. The main window 30 includes a first display area 31, and a second display area 32 wider than the first display area 31. Further, the first display area 31 includes an image display area 35.

The display control unit 24 controls display content of the first display area 31 and the second display area 32. Further, the display control unit 24 causes the main window 30 to be in one of a first display control state illustrated in FIG. 4 and a second display control state illustrated in FIG. 5.

If an operation with respect to the display mode switching button 28 displayed in the first display area 31 is detected by the operation detection unit 22, the operation execution unit 23 switches the display state of the display control unit 24 for the main window 30 between the first display control state and the second display control state. Also, the main window 30 of the first display control state illustrated in FIG. 4 and the main window 30 of the second display control state illustrated in FIG. 5 are different from each other in the selected parameters.

In the first display control state illustrated in FIG. 4, the display control unit 24 hierarchically displays a setting parameter item including a name of the parameter and a set value set in the parameter, and a group parameter item indicating a group of parameters in the first display area 31.

Hereinafter, the setting parameter item and the group parameter item are collectively simply referred to as a "parameter item".

Further, the display control unit 24 causes an execution result of the process referring to the set values set in the parameters to be displayed in the second display area 32. Specifically, the display control unit causes an execution result of the test in the test execution unit 11 referring to the set values set in the parameters to be displayed in the second display area 32.

The display control unit 24 displays the group parameter item of the first layer as the tab 33 in the first display area 31, displays, in the list 34, the group parameter item (for example, "Frequency" and "Level" in FIG. 4) of the second layer included in the group of the parameter ("Common" in FIG. 4) of the first layer corresponding to the tab 33 selected from the group of the parameters of the first layer, and arranges the setting parameter item (for example, "Frame Structure" in FIG. 4) of the third layer included in the group selected from among parameters of the second layer, in the vertical direction in the same list 34 as the group parameter item of the second layer.

Also, while the number of layers of parameter items is 3 in the description of the present embodiment, the number of layers of the parameter items may be 4 or more. In this case, the display control unit 24 is configured to display parameter items of fourth and subsequent layers in a list format in the parameter items of an upper layer so that display modes of the parameter items of successive layers are different and different layers are recognized.

Thus, the display control unit 24 causes an image (hereinafter referred to as a "list image") including the respective parameter items constituting the list 34, that is, the respective parameter items of the second layer or the lower layer to be displayed in the image display area 35.

Figure 6:
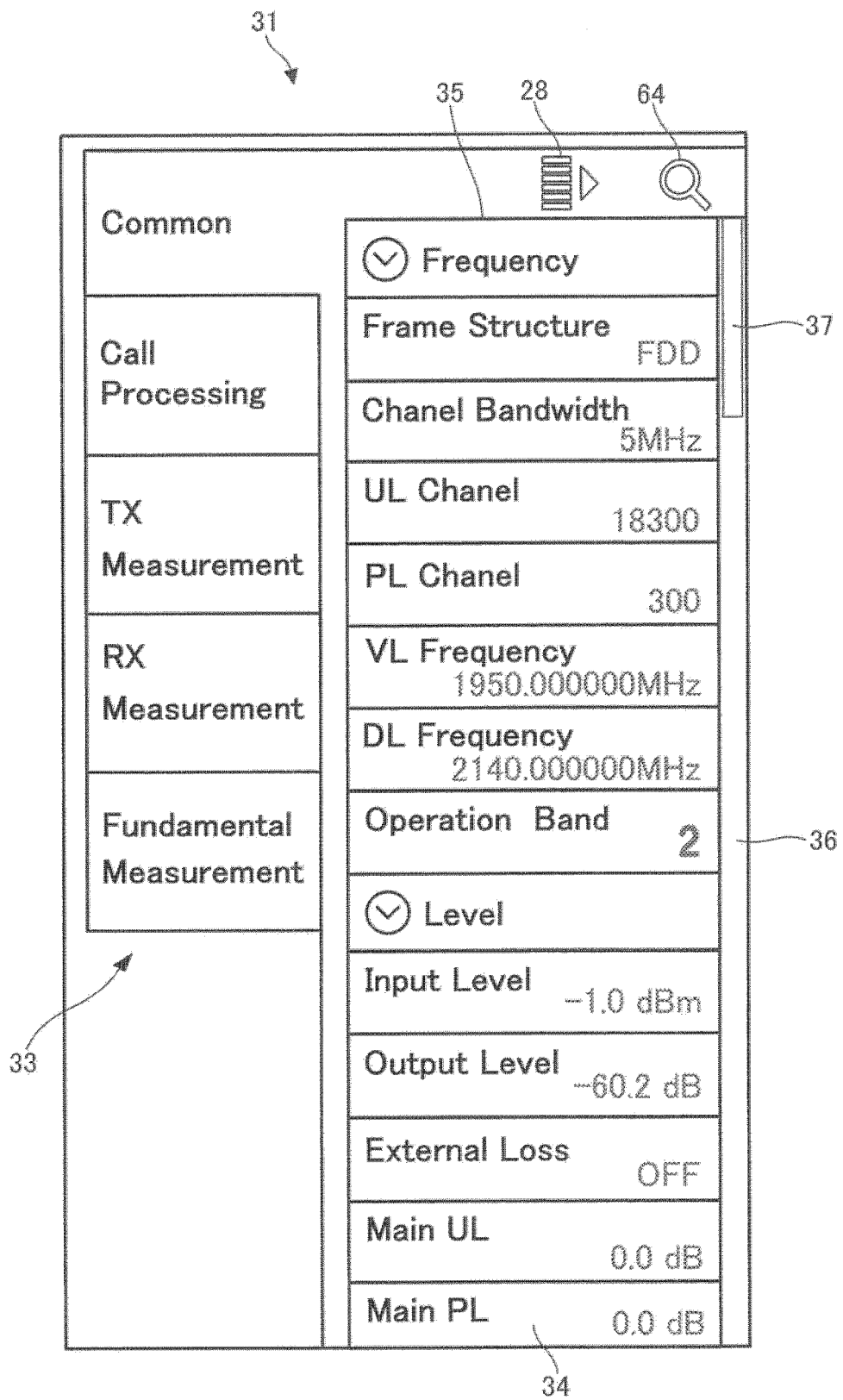
FIG. 6 is a schematic diagram illustrating a portion of a first display area of the main window illustrated in FIG. 4.

As illustrated in FIG. 6, the display control unit 24 displays the name of the parameter on the left in each parameter item constituting the list 34, and displays the set value set in the parameter on the right under the name of the parameter.

It is possible to compactly display the respective parameter items in a width direction by displaying respective parameter items constituting the list 34 in this way. Meanwhile, the respective parameter items are longitudinally arranged, but each parameter item is easily selected (for example, tapped) when the input device 20 is configured of the touch panel 25, as in the present embodiment.

Further, the display control unit 24 displays the name of the parameter and the set value set in the parameter in different display modes on the display device 21 in each parameter item constituting the list 34.

For example, the display control unit 24 displays the name of the parameter and the set value set in the parameter in different display colors on the display device 21 in each parameter item constituting the list 34.

Further, the display control unit 24 sets a set value of the parameter indicating an initial value and a set value of the parameter changed from the initial value in different display modes on the display device 21.

For example, the display control unit 24 sets the set value of the parameter indicating the initial value and the set value of the parameter changed from the initial value in different display colors on the display device 21.

The display control unit 24 displays all names of the parameters in the respective parameter items constituting the list 34 in the same display modes on the display device 21. Accordingly, visibility of the parameter name is improved for a user who wants to see only the parameter names.

In the example illustrated in FIG. 6, the initial value of the parameter "Operation Band" of the third layer associated with the first layer "Common" and the second layer "Frequency" is "1", but the set value is changed to "2".

Also, the display control unit 24 may display an initial setting button (not illustrated) for returning set values of all the parameters to the initial values in the first display area 31. In this case, the operation execution unit 23 returns the set values of all the parameters to the initial values if the operation detected by the operation detection unit 22 is an operation with respect to the initial setting button.

The display control unit 24 can cause the list image to be displayed in a state in which the list image is scrolled in the image display area 35 assigned in the first display area 31. Therefore, the display control unit 24 displays the scroll bar 36 for scrolling the list image together with the list image on the display device 21. Here, the scroll bar 36 includes a slider 37 that indicates a scroll amount of the list image and is displaced according to an operation performed by the input device 20.

In FIG. 1, the operation execution unit 23 includes a scroll amount specifying unit 40 that specifies the scroll amount (amount to be scrolled) of the list image according to the operation detected by the operation detection unit 22 if the operation detected by the operation detection unit 22 is an operation of scrolling the list image.

Here, operations of scrolling the list image include an operation of dragging the list image in the image display area 35 in the input device 20 as illustrated in FIG. 7A-7D, an operation of dragging the slider 37 of the scroll bar 36 as illustrated in FIG. 8A-8D, and the like.

Further, the operation execution unit 23 includes a scroll amount regulation unit 41 that regulates the scroll amount so that the list image is not out of the image display area 35 if the image list is scrolled to be out of the image display area 35 and, in other words, to protrude from the image display area 35 when the list image is scrolled according to the scroll amount specified by the scroll amount specifying unit 40. That is, the scroll amount regulation unit 41 regulates the amount to be scrolled so that an end of the list image that is a predetermined image displayed in the image display area 35 does not enter the inside of the image display area 35 when the end of the list image enters the inside of the image display area 35 if the list image is scrolled by the display control unit 24 according to the amount to be scrolled specified in the scroll amount specifying unit 40.

The display control unit 24 causes the list image to be scrolled according to the scroll amount, and changes a display mode of at least a portion of the peripheral area of the image display area 35 if the scroll amount is regulated by the scroll amount regulation unit 41.

In the present embodiment, at least a portion of the peripheral area of the image display area 35 is the slider 37 of the scroll bar 36. Here, the display control unit 24 changes the display mode of the slider 37 according to a regulation amount of the scroll amount regulated by the scroll amount regulation unit 41.

That is, the display control unit 24 greatly changes the display mode of the slider 37 when the regulation amount of the scroll amount regulated by the scroll amount regulation unit 41 increases. For example, the display control unit 24 changes the display mode of the slider 37 by changing the shading of the display color of the slider 37, as illustrated in FIGS. 7 and 8.

Figures 8A, 8B, 8C, 8D:
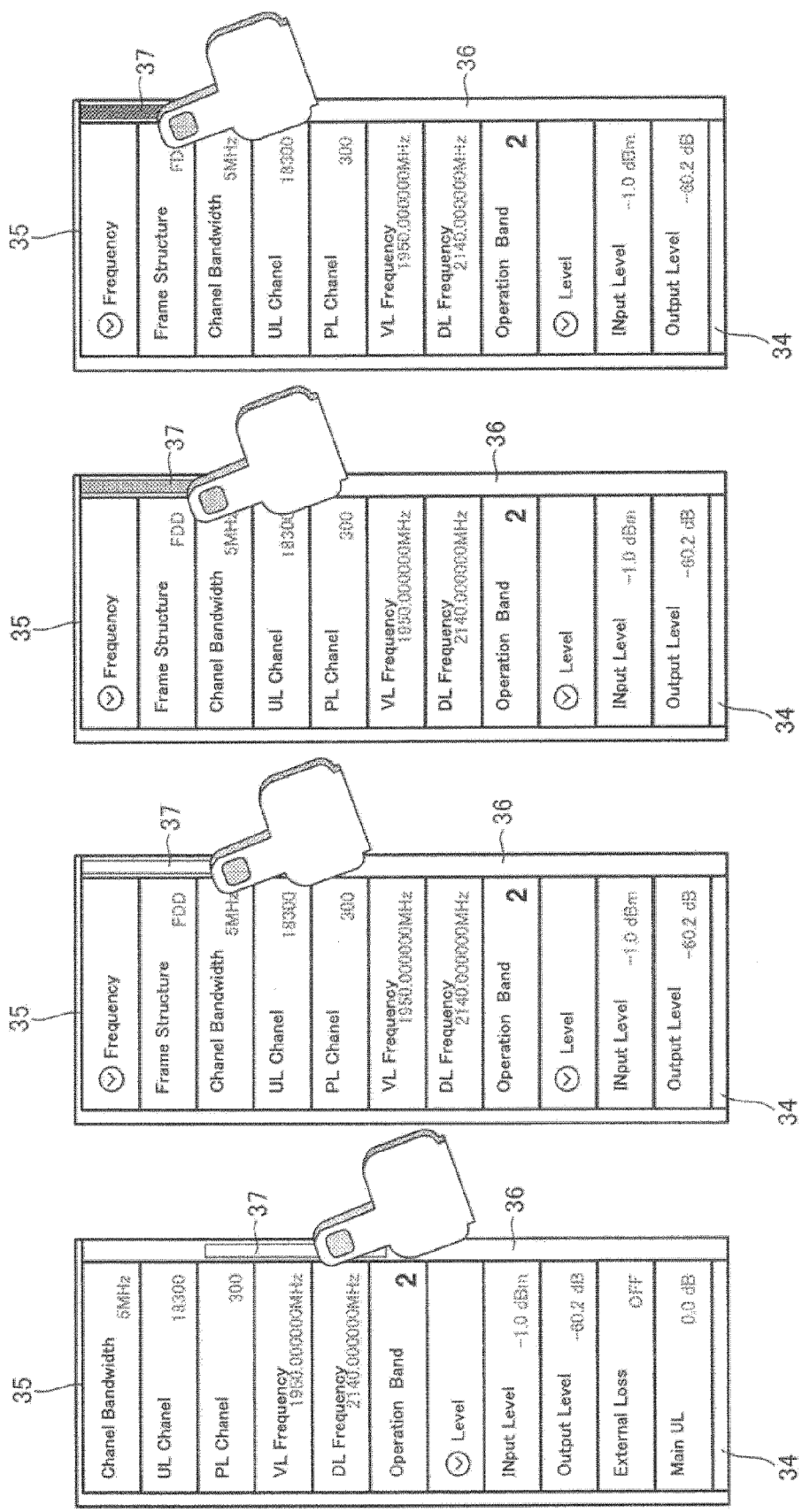
FIG. 8A is a schematic diagram illustrating a list image scrolled in the image display area in the first display area of the main window illustrated in FIG. 4.
FIG. 8B is a schematic diagram illustrating a list image scrolled to an end in the image display area.
FIG. 8C is a schematic diagram illustrating the list image of which the scroll is regulated in the image display area.
FIG. 8D is a schematic diagram illustrating the list image of which the scroll is further regulated in the image display area.

In FIGS. 7A to 7D and FIGS. 8A to 8D, FIGS. 7A and 8A illustrate a state in which the list image longer than a length of the image display area 35 is scrolled downward in the drawings in the image display area 35, and FIGS. 7B and 8B illustrate a state in which the list image is scrolled to a boundary in the image display area 35 and, specifically, an upper end of the list image is scrolled to an upper end of the image display area 35. In these states, the display control unit 24 does not change the shading of the display color of the slider 37.

On the other hand, in FIGS. 7A to 7D and FIGS. 8A to 8D, FIGS. 7C and 8C and FIGS. 7D and 8D illustrate a state in which a scroll amount of the list image is regulated by the scroll amount regulation unit 41. In particular, FIGS. 7D and 8D illustrate a state in which the list image is further scrolled downward in FIGS. 7D and 8D from the state illustrated in FIGS. 7C and 8C. In these states, the display control unit 24 changes the shading of the display color of the slider 37.

Here, since the regulation amount of the scroll amount regulated by the scroll amount regulation unit 41 is larger in the state illustrated in FIGS. 7D and 8D than in the state illustrated in FIGS. 7C and 8C, the display control unit 24 increases the shading of the display color of the slider 37 in the state illustrated in FIGS. 7D and 8D relative to the shading of the display color of the slider 37 in the state illustrated in FIGS. 7C and 8C.

Referring back to FIG. 5, in the second display control state, the display control unit 24 hierarchically displays the parameter items indicating groups of parameters in the first display area 31. Further, in the second display control state, the display control unit 24 displays, side by side in the second display area 32, the list in which the parameter items obtained by developing the group of parameters are arranged in units of groups.

Also, as described above, in the first display control state as illustrated in FIG. 4, the display control unit 24 switches the main window 30 to the second display control state as illustrated in FIG. 5 when the display mode switching button 28 is pressed.

In the second display control state, the display control unit 24 displays a parameter item developed and displayed in the second display area 32 and a parameter item not displayed in the second display area 32 among parameter items displayed in the first display area 31 in different display modes on the display device 21 so that the parameters can be identified.

For example, the display control unit 24 displays the parameter items ("Mobile Station Identity", "Power Control" and "BCCH/PCCH") developed and displayed in the second display area 32 and the parameter item ("Base Station Identity") not displayed in the second display area 32 among four types of parameters (group name) displayed in the first display area 31 in different display colors on the display device 21 so that the parameters can be identified.

The display control unit 24 displays association information for associating the parameter items displayed in the first display area 31 with a column in which the parameter items developed and displayed in the second display area 32 are arranged, on the display device 21.

For example, the display control unit 24 assigns identifiers such as numbers, as the association information, to the parameter items displayed in the first display area 31 and the column in which the parameter items developed and displayed in the second display area 32 are arranged, and displays them on the display device 21.

If it is detected by the operation detection unit 22 that the parameter item indicating the group of parameters is selected from among the parameter items displayed in the first display area 31 in the first display control state or the second display area 32 in the second display control state, the operation execution unit 23 requests the display control unit 24 to aggregate the group of parameters if the group of parameters is developed or to develop the group of parameters if the group of parameters is aggregated.

Here, when the group of parameters is developed, a lower parameter item is arranged under the parameter item indicating this parameter group. On the other hand, when the parameter group is aggregated, a lower parameter item of the parameter group is not displayed. If there is a parameter item indicating a next group of parameters, a parameter item indicating the next group of parameters is arranged under the aggregated parameter item.

For example, a state in which, in the list 34 illustrated in FIG. 4, respective setting parameter items "Frame Structure", "Channel Bandwidth", "UL Channel", "DL Channel", "UL Frequency", "DL Frequency", and "Operation Band" of the third layer are displayed under the group parameter item "Frequency" classified as the second layer is shown.

Here, if the group parameter item "Frequency" in the second layer is aggregated, the respective setting parameter items "Frame Structure", "Channel Bandwidth", "UL Channel", "DL Channel", "UL Frequency", "DL Frequency", and "Operation Band" of the third layer are not displayed, and the group parameter item "Level" classified as the second layer is displayed immediately under the group parameter item "Frequency" of the second layer.

Since the parameter items can be developed and aggregated in the vertical direction rather than the horizontal direction, it is possible to display the lower setting parameter items as the list 34 by developing a specific group parameter item, and to compactly display the parameter items as the list 34 by aggregating the specific group parameter item.

Further, the operation execution unit 23 executes a parameter setting process if an operation of selecting a parameter item indicating the setting parameter item including the name of the parameter and the set value set in the parameter among the parameter items displayed in the first display area 31 in the first display control state or the second display area 32 in the second display control state is detected.

In the present embodiment, the parameter setting process executed by the operation execution unit 23 includes three processes: an ON and OFF setting process, a list selection process, and a setting screen process. The operation execution unit 23 determines any one of the processes to be executed, according to the parameter that is a selection target.

The ON and OFF setting process is executed for the parameter of which the set value is switched between "ON" and "OFF", such as the parameter "Authentication" of the third layer associated with the first layer "Call Processing" and the second layer "Mobile Station Identity".

In the ON and OFF setting process, each time the operation of selecting the parameter item is detected by the operation detection unit 22, the operation execution unit 23 alternately sets "ON" and "OFF" in the parameter that is a selection target via the parameter management unit 14.

The list selection process is executed for a parameter for which one value is selected from among the plurality of candidate values that are candidates of the value of the parameter, such as the parameter "Frame Structure" of the third layer associated with the first layer "Common" and the second layer "Frequency".

In the list selection process, if the operation detection unit 22 detects the operation of selecting the parameter item, the operation execution unit 23 requests the display control unit 24 to change the value of the parameter. The display control unit 24 receiving this change request causes the display device 21 to display the candidate values as candidates of the value of the parameter in a list format. The operation execution unit 23 sets the candidate value selected from among the plurality of candidate values displayed on the display device 21 in the parameter through the parameter management unit 14.

Figures 9A, 9B, 9C:
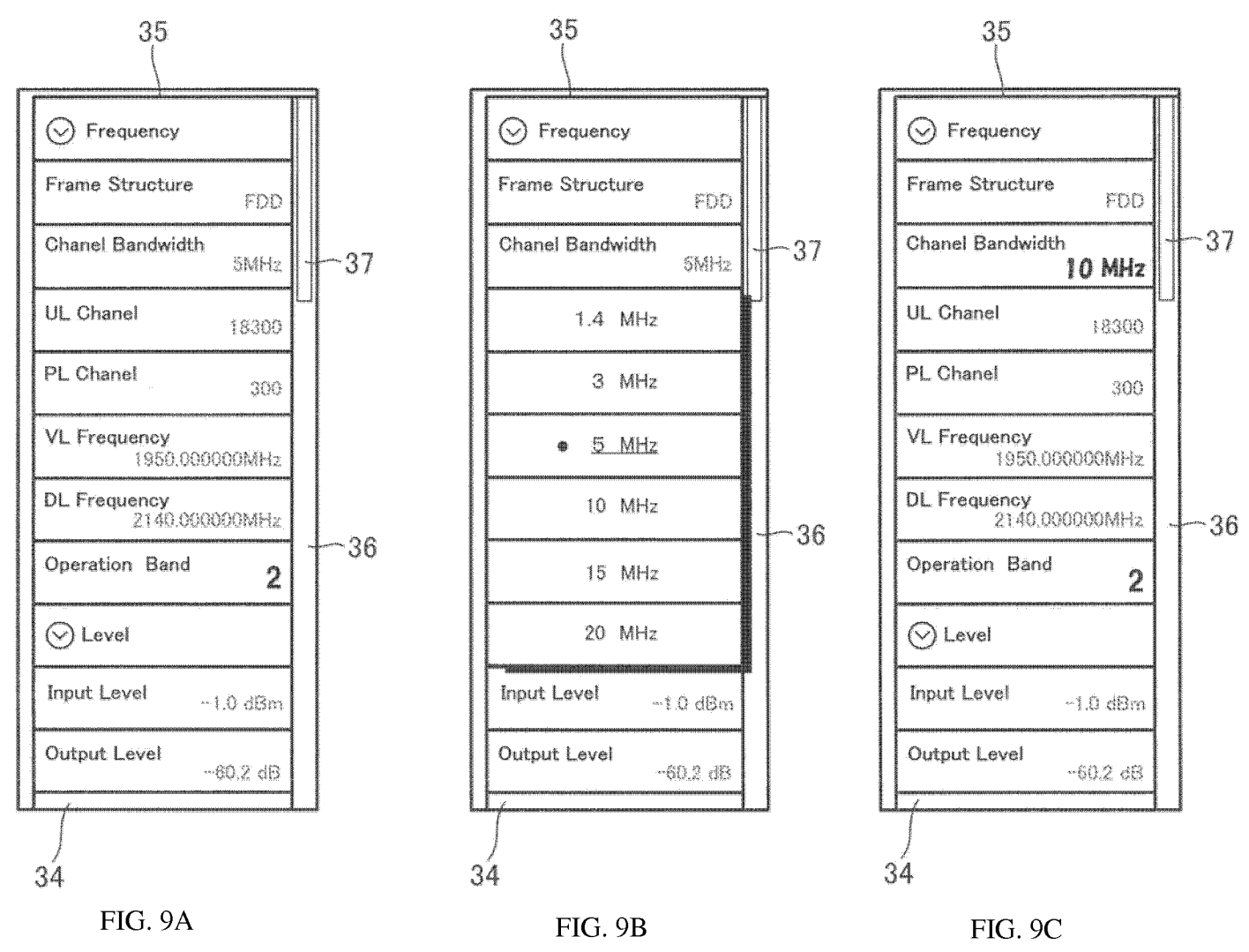

For example, as illustrated in FIGS. 9A to 9C, when the parameter item of which the parameter name is "Channel Bandwidth" is selected with respect to the list image displayed as illustrated in FIG. 9A, the display control unit 24 causes the display device 21 to display "1.4 MHz", "3 MHz", "5 MHz", "10 MHz", "15 MHz", and "20 MHz" as candidate values which are candidates of the value of the parameter in a list format, as illustrated in FIG. 9B.

Here, the display control unit 24 causes the display device 21 to display an initial value (5 MHz) of the parameter in a different display mode from the other candidate values. For example, the display control unit 24 causes the display device 21 to display the initial value of the parameter in a different display mode from the other candidate values by underlining the initial value of the parameter.

The display control unit 24 causes the candidate value of the parameter to be displayed in a list format under the parameter item that is a selection target so that the value of the parameter set before the list selection process is executed is easily referred to.

Specifically, the display control unit 24 causes respective candidate values "1.4 MHz", "3 MHz", "5 MHz", "10 MHz", "15 MHz", and "20 MHz" to be displayed in a list format so that the parameter item is developed under the parameter name of "Channel Bandwidth", as in the example illustrated in FIG. 9B.

Here, when the candidate values of the parameter cannot be displayed in a list format under the parameter item due to a display position of the parameter item that is a selection target, the display control unit 24 may cause the list image to be scrolled such that the candidate values of the parameter can be displayed in the list format under the parameter item that is the selection target.

Further, the display control unit 24 causes the display device 21 to display the set value of the parameter in a different display mode from another candidate value such that the set value of the parameter is easily referred to. For example, the display control unit 24 in the present embodiment attaches a mark to the left of the set value of the parameter.

When "10 MHz" is selected from among candidate values: "1.4 MHz", "3 MHz", "5 MHz", "10 MHz", "15 MHz", and "20 MHz" in a state illustrated in FIG. 9B, the set value of "Channel Bandwidth" is changed to "10 MHz", as illustrated in 9C.

The setting screen process is executed for the parameter of which the value is directly set, as in the parameter "DL Frequency" of the third layer associated with the first layer "Common" and the second layer "Frequency".

Figure 10:
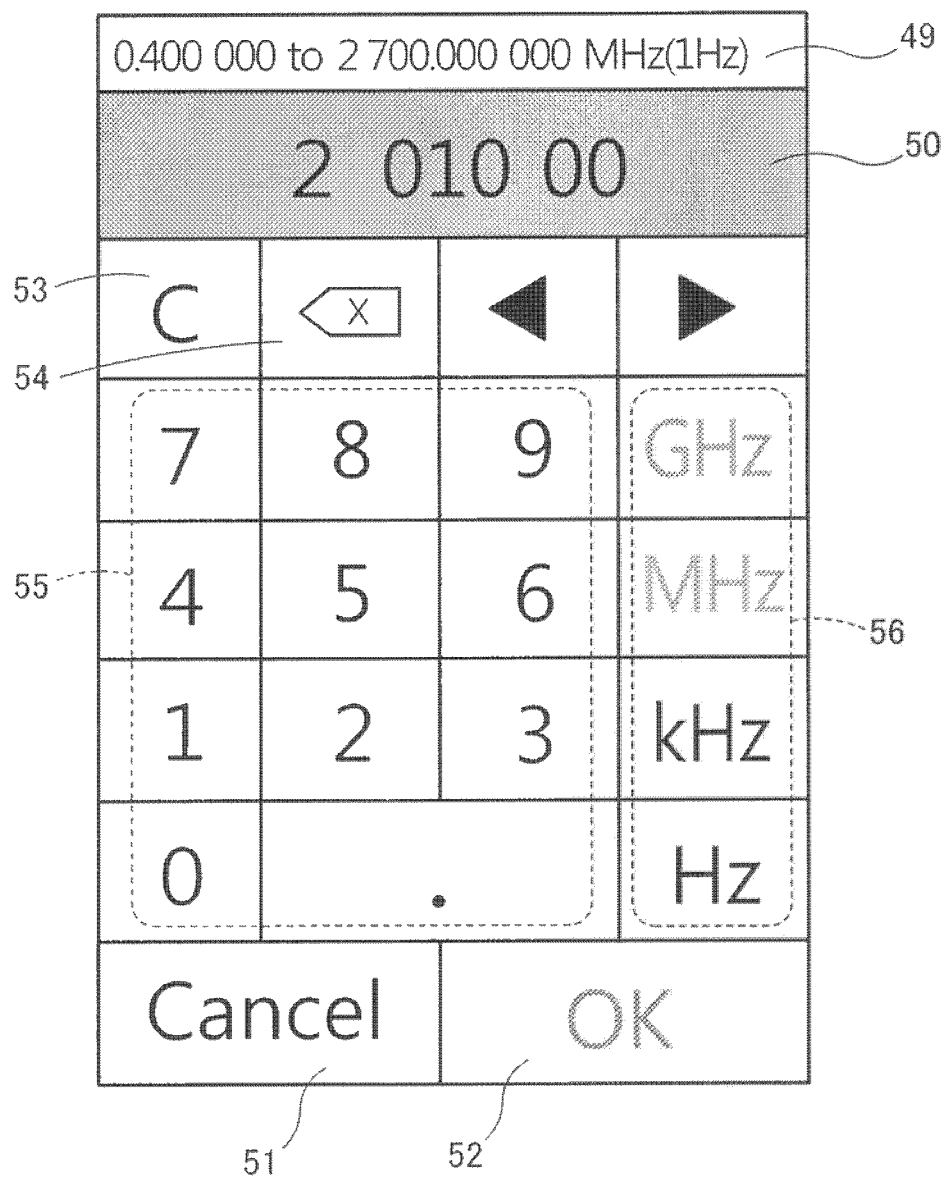
FIG. 10 is a first schematic diagram of a parameter setting screen displayed by the mobile terminal test device according to the embodiment of the present invention.
Figure 11:
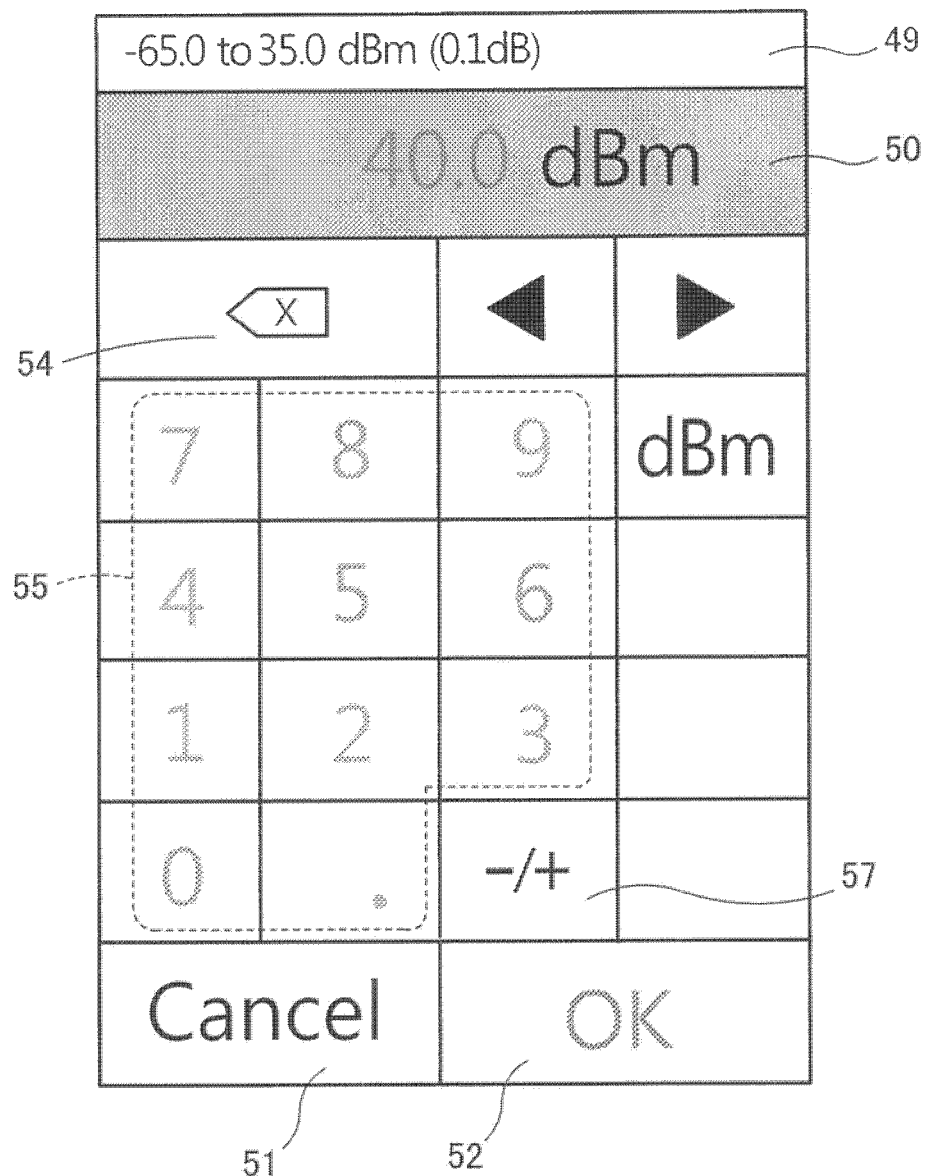
FIG. 11 is a second schematic diagram of the parameter setting screen displayed by the mobile terminal test device according to the embodiment of the present invention.
Figure 12:
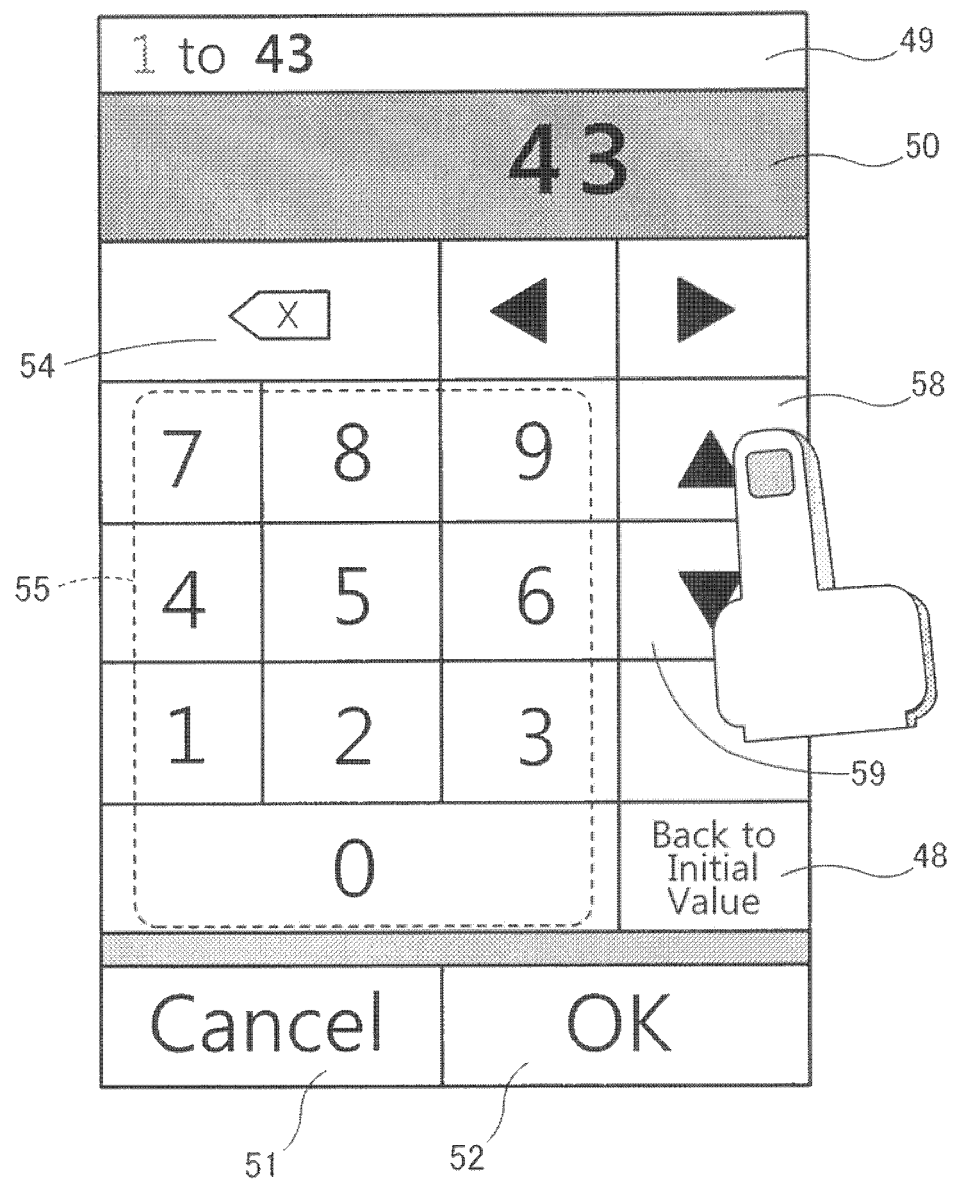
FIG. 12 is a third schematic diagram of the parameter setting screen displayed by the mobile terminal test device according to the embodiment of the present invention.

In the setting screen process, if the operation detection unit 22 detects the operation of selecting the parameter item, the operation execution unit 23 requests the display control unit 24 to change the value of the parameter. The display control unit 24 receiving the change request displays the parameter setting screen including at least operation elements for causing the set value of the parameter to be set, on the display device 21, as illustrated in FIGS. 10 to 12. The operation execution unit 23 sets the set value in the parameter through the parameter management unit 14 based on the parameter setting screen.

The operation execution unit 23 includes an input value specifying unit 42 that specifies an input value of the parameter in response to the operation with respect to the operation element in the setting screen process detected by the operation detection unit 22. Here, operation elements displayed on the parameter setting screen include a cancel button for canceling a setting, an OK button for confirming the setting, a clear button for clearing the input value, a backspace button for canceling one character of the input value, a number button for inputting a value, a unit button for inputting a unit, an inverse-number conversion button for performing inverse-number conversion, and the like.

The display control unit 24 selectively displays the buttons on the parameter setting screen according to the parameter that is a selection target, in addition to the input value 50 of the parameter. In the parameter setting screen for the parameter "DL Frequency" illustrated in FIG. 10, the display control unit 24 displays a cancel button 51, an OK button 52, a clear button 53, a backspace button 54, a number button 55, and a unit button 56.

In a state in which the parameter setting screen is displayed, if the operation detected by the operation detection unit 22 is an operation of setting the input value of the parameter to be out of the setting range of the parameter, the input value specifying unit 42 invalidates the operation with respect to the operation element. The display control unit 24 causes the display device 21 to display the operation element so that the invalidation of the operation of setting the input value of the parameter to be out of the setting range of the parameter is identified.

That is, the input value specifying unit 42 and the display control unit 24 cause each operation element to enter an enable state or a disable state according to the setting range and the input value of the parameter that is a selection target.

For example, in the parameter setting screen illustrated in FIG. 10, the setting range of "0.400000 MHz" to "2700.000000 MHz" is defined for the parameter "DL Frequency". Accordingly, when "2010000" is input in the parameter setting screen, each unit button 56 indicating "MHz" and "GHz" is disabled, each unit button 56 indicating "kHz" and "Hz" is enabled, and the OK button 52 is also disabled since the unit is not determined for the input value.

Here, the operation elements in a disable state (each unit button 56 indicating "GHz" and "MHz" and the OK button 52) are displayed with colors different from the operation element in an enable state and lighter than the operation element in the enable state.

Further, when the display control unit 24 causes the display device 21 to display the respective operation elements for selecting the values and the inverse-number conversion, the input value specifying unit 42 validates the operation with respect to the operation element if an operation of causing the inverse number of the input value of the parameter to be in the setting range of the parameter even when the operation detected by the operation detection unit 22 is an operation of causing the input value of the parameter to be out of the setting range of the parameter. Also, the display control unit 24 causes the display device 21 to display the operation element so that it can be identified that the operation of causing the inverse number of the input value of the parameter to be in the setting range of the parameter is validated even when the operation is the operation of causing the input value of the parameter to be out of the setting range of the parameter.

However, if the input value of the parameter is out of the setting range, the display control unit 24 displays the input value of the parameter with a different display mode from the display mode when the input value of the parameter is in the setting range.

In the present embodiment, if the input value of the parameter is out of the setting range, the display control unit 24 displays the input value of the parameter with a different display color from the display color when the input value of the parameter is in the setting range.

For example, as illustrated in FIG. 11, in a parameter setting window of the parameter "Input Level" of the third layer correlated with the first layer "Common" and the second layer "Level", a setting range of "−65.0 dBm" to "35.0 dBm" is defined for the parameter "Input Level", and thus, "40.0 dBm" is out of the setting range of the parameter. However, when an inverse-number conversion button 57 is operated, the inverse-number "−40.0 dBm" can be in the setting range, and thus, an input of "40.0 dBm" is permitted.

However, since any larger value cannot be input in a state in which "40.0 dBm" is input, all number buttons 55 enter a disable state. Further, since "40.0 dBm" is out of the setting range, the input value 50 is displayed in a different display color from that when the input value is in the setting range of the parameter.

Further, in an aspect other than an aspect in which the input value specifying unit 42 and the display control unit 24 cause each operation element to be in an enable state or a disable state, the input value specifying unit 42 may regulate the input value of the parameter to be in the setting range if the input value of the parameter is out of the setting range of the parameter.

Here, the display control unit 24 may change the display mode of the input value of the parameter if the input value of the parameter is regulated by the input value specifying unit 42. For example, the display control unit 24 may change the display mode of the input value of the parameter by changing a display color of the input value of the parameter.

Further, the display control unit 24 may cause the display device 21 to display the parameter setting screen to further indicate the setting range, and change the display mode of the regulation value that causes the input value of the parameter in the setting range to be out of the setting range if the input value of the parameter is regulated by the input value specifying unit 42. For example, the display control unit 24 may display the setting range in a title bar 49 of the parameter setting screen, and change the display color of the regulation value causing the input value of the parameter in the setting range to be out of the setting range to change the display mode of the regulation value.

For example, as illustrated in FIG. 12, in the parameter setting screen of the parameter "Operation Band" of the third layer associated with the first layer "Common" and the second layer "Frequency", a setting range of "1" to "43" is defined for the parameter "Operation Band", and thus, the input value smaller than "1" is regulated to be "1" and the input value greater than "43" is regulated to be "43".

In the parameter setting screen of "Operation Band" illustrated in FIG. 12, the display control unit 24 displays an increment button 58 that increments a minimum digit of the input value by 1, and a decrement button 59 that decrements the minimum digit of the input value by 1.

In this parameter setting screen of "Operation Band", if the increment button 58 is operated in a state in which "43" is input, the input value is regulated to be "43". Also, the input value 50 is displayed in a different display color from that when the input value 50 is in the setting range of the parameter.

Further, the regulation value causing the input value of the parameter in the setting range displayed in the title bar 49 of the parameter setting screen to be out of the setting range is displayed in a different display color from that when the input value is in the setting range of the parameter.

Further, the display control unit 24 displays, as an operation element of the parameter setting screen, an initialization button 48 that returns an input value of a parameter that is being set, to an initial value (a "Back to Initial Value" button in the drawing).

If an operation with respect to the initialization button 48 is detected by the operation detection unit 22, the operation execution unit 23 sets an input value of the parameter setting screen to an initial value of the parameter that is being set.

For example, in the parameter setting screen of "Operation Band" illustrated in FIG. 12, if an operation with respect to the initialization button 48 is detected by the operation detection unit 22, the operation execution unit 23 sets the input value of the parameter setting screen to "1" that is the initial value of "Operation Band". That is, if the initialization button 48 is operated, "1" is displayed in the input value 50 of the parameter. Also, the initialization button 48 may also be provided in the respective parameter setting screens illustrated in FIGS. 10 and 11.

Figure 13:
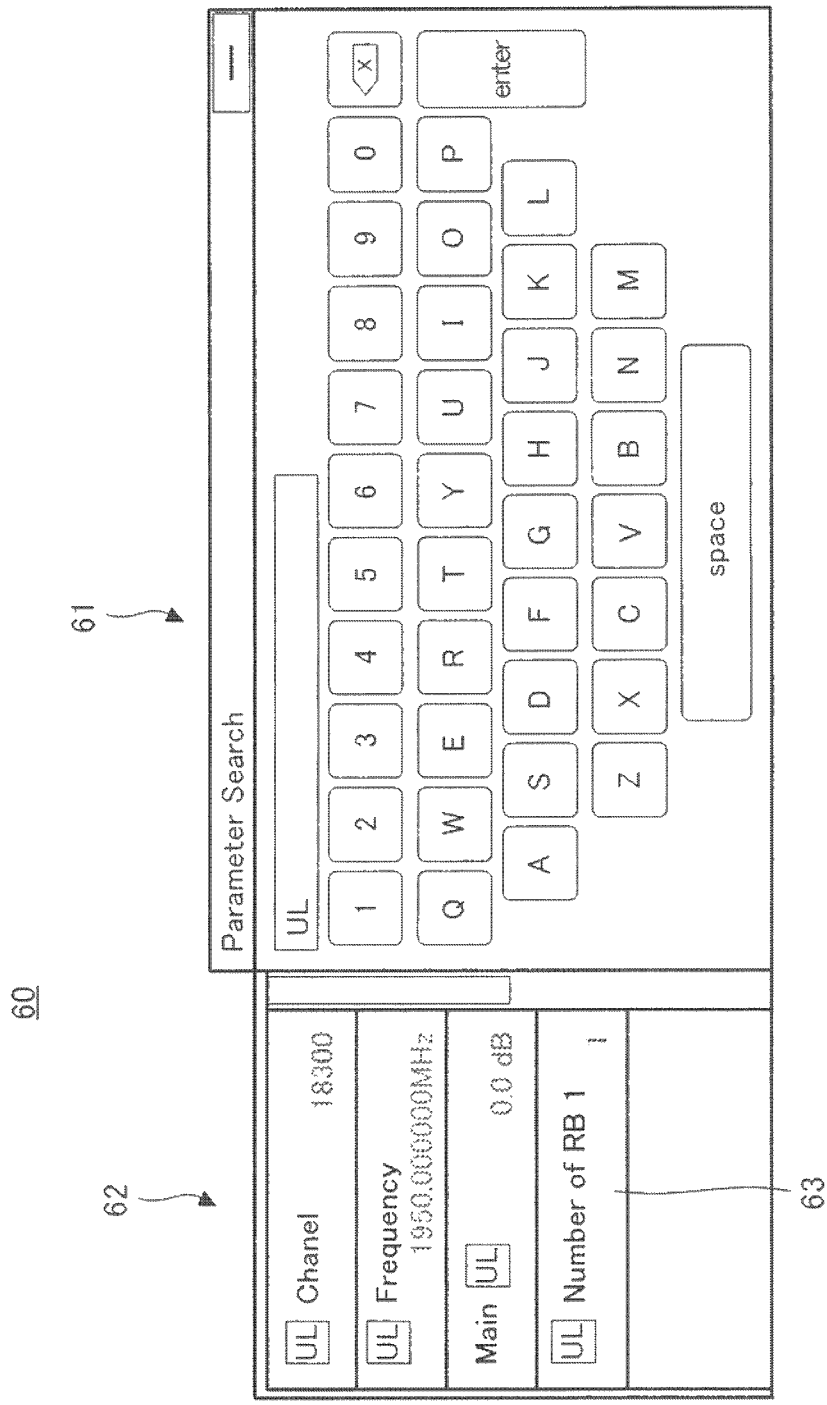
FIG. 13 is a schematic diagram of a parameter extraction screen displayed by the mobile terminal test device according to the embodiment of the present invention.

The display control unit 24 causes the display device 21 to display the parameter extraction screen 60 as illustrated in FIG. 13 if the operation with respect to the parameter extraction button 64 displayed in the first display area 31 is detected by the operation detection unit 22.

The parameter extraction screen 60 includes an input screen display area 61, and an extraction result display area 62. The display control unit 24 displays operation elements for setting search conditions of the parameters, such as a plurality of keys for inputting the parameter name, and the search conditions input by the input operation with respect to the plurality of keys, in the input screen display area 61. Also, the search conditions in the present embodiment are assumed to include an input keyword.

The operation execution unit 23 includes a parameter extraction unit 43 that extracts the parameters satisfying the search conditions from a hierarchized parameter group. In the present embodiment, the parameter extraction unit 43 extracts the parameters satisfying the search conditions from the parameter group of the third layer included in all the first layers. Further, the display control unit 24 causes the display device 21 to display the parameter extraction screen 60 indicating the parameters extracted by the operation execution unit 23.

Also, the parameter extraction unit 43 is configured to extract the parameters satisfying the search conditions from the parameter group of the third layer included in the first layer that is selected in the first display area 31 of the main window 30.

The scroll amount specifying unit 40 and the scroll amount regulation unit 41 function for the list 63 displayed in the extraction result display area 62, similarly to the list 34 displayed in the first display area 31 of the main window 30.

Further, the operation execution unit 23 executes the process corresponding to a selection target parameter among the three types of processes, including the ON and OFF setting process, the list selection process, and the setting screen process described above, according to the parameter selected from the list 63.

For example, when an operation with respect to the parameter extraction button 64 of the main window 30 is detected by the operation detection unit 22, the parameter extraction screen 60 is displayed in front of the main window 30 by the display control unit 24.

Here, when "UL" is input as the search condition in the input screen display area 61 of the parameter extraction screen 60, the list 63 of the parameter items of the parameter "UL Channel" and "UL Frequency" of the third layer associated with the first layer "Common" and the second layer "Frequency", the parameter "Main UL" of the third layer associated with the first layer "Common" and the second layer "Level", and the parameter "UL Number of RB 1" of the third layer associated with the first layer "TX Measurement Setup" and the second layer "Relative Power" is displayed on the extraction result display area 62 by the display control unit 24.

The operation execution unit 23 performs an operation to set the values of the parameters selected from among the parameters displayed on the parameter extraction screen. For example, when the operation with respect to the parameter "UL Channel" of the third layer associated with the first layer "Common" and the second layer "Frequency" is detected by the operation detection unit 22, the operation execution unit 23 controls the display control unit 24 to display the parameter setting screen as illustrated in FIG. 10 on the display device 21.

Since the operation execution unit 23 executes the operation to set the values of the parameters selected from among the parameters displayed in the parameter extraction screen in this way, an effort of the user to switch from the parameter extraction screen 60 to the main window 30 in order to set the values of the parameters can be omitted.

Also, the display control unit 24 may causes the display device 21 to display an extraction result screen obtained by hierarchizing the parameters extracted by the parameter extraction unit 43 in the same classification as the hierarchized parameter group described with reference to FIGS. 2 and 3.

Specifically, the display control unit 24 may display the extraction result obtained by hierarchizing the parameters extracted by the parameter extraction unit 43 in the extraction result display area 62 of the parameter extraction screen 60.

That is, the display control unit 24 may display the parameter items of the parameters extracted by the parameter extraction unit 43 in the list 63 in the same format as the list 34 displayed in the first display area 31 of the main window 30.

As described above, in the present embodiment, if the operation of scrolling the list image displayed in the image display area 35 to be out of the image display area is detected, the scroll amount is regulated and the list image displayed in the image display area 35 is scrolled so that the list image displayed in the image display area 35 is not out of from the image display area 35, and the display mode of at least a portion of the peripheral area of the image display area 35 is changed to cause the user to recognize that the list image has been scrolled to the end in the image display area 35. Thus, it is possible to cause the list image displayed on the display device 21 to be visually recognized without degrading the operability of the user.

Further, in the present embodiment, it is possible to cause the user to recognize that the list image displayed in the image display area 35 is further scrolled regardless of the fact that the list image has been scrolled to the end in the image display area 35 by changing the display mode of at least a portion of the peripheral area of the image display area 35 according to the regulation amount of regulated scroll amount.

Further, in the present embodiment, it is possible to cause the user to recognize that the list image has been scrolled to the end in the image display area by changing the display mode of the slider of the scroll bar if the list image is scrolled to the end in the image display area 35.

Further, in the present embodiment, it is possible to cause the user to recognize that the list image has been scrolled to the end in the image display area by changing the shading of the display color of the slider 37 of the scroll bar 36 if the list image is scrolled to the end in the image display area 35.

Also, the image display method in the present embodiment includes an operation detection step, a scroll amount specifying step, a scroll amount regulation step, and an image scroll step. The operation detection step is executed by the operation detection unit 22, the scroll amount specifying step is executed by the scroll amount specifying unit 40, the scroll amount regulation step is executed by the scroll amount regulation unit 41, and the image scroll step is executed by the display control unit 24.

While the embodiments of the present invention have been disclosed above, it is obvious to those skilled in the art that modifications may be made without the departing from the scope of the present invention. All such modifications and equivalents are intended to be included within the claims described in the appended claims.

DESCRIPTION OF REFERENCE NUMERALS AND SIGNS 21 display device
22 operation detection unit
24 display control unit
35 image display area
36 scroll bar
37 slider
40 scroll amount specifying unit
41 scroll amount regulation unit
42 input value specifying unit

What is claimed is:

1. An image display device that displays a portion of a predetermined image to be displayed in an image display area of a display, and scrolls the predetermined image according to a detected scroll operation with respect to the predetermined image, the image display device comprising:
    at least one processor and memory configured to:
    detect a scroll operation with respect to the predetermined image displayed in the image display area of the display;
    specify an amount of the predetermined image displayed in the image display area to be scrolled according to the detected scroll operation;
    scroll the predetermined image according to the amount to be scrolled;
    regulate the amount to be scrolled so that an end of the predetermined image does not enter the inside of the image display area if the predetermined image is scrolled in the image display area according to the amount to be scrolled;
    change a display mode of at least a portion of a peripheral area of the image display area in the display when the amount to be scrolled is regulated;
    display a scroll bar for scrolling the predetermined image together with the predetermined image on the display; and
    change a display mode of a slider of the scroll bar when the amount to be scrolled is regulated by changing a degree of shading of a display color of the slider according to a relational amount of the regulated amount to be scrolled.

2. A test device comprising at least the image display device according to claim 1, the at least one processor being further configured to:
    perform a test of a tested terminal;
    set test conditions by detecting an input operation with respect to the predetermined image displayed in the image display area; and
    execute the test based on the test conditions.

3. An image display method of causing an image display device to display a portion of a predetermined image to be displayed in an image display area of a display, the method comprising:
    detecting a scroll operation with respect to the predetermined image displayed in the image display area of the display;
    a scroll amount specifying step of specifying an amount of the predetermined image displayed in the image display area to be scrolled according to the detected scroll operation;
    regulating the amount to be scrolled so that an end of the predetermined image does not enter the inside of the image display area if the predetermined image is scrolled according to the amount to be scrolled;
    scrolling the predetermined image according to the amount to be scrolled; changing a display mode of at least a portion of a peripheral area of the image display area when the amount to be scrolled is regulated; and
    displaying a scroll bar for scrolling the predetermined image together with the predetermined image; and
    changing a display mode of the slider of the scroll bar when the amount to be scrolled is regulated by changing a degree of shading of a display color of the slider according to a relational amount of the amount to be scrolled.

* * * * *